(12) United States Patent
Ogasahara

(10) Patent No.: US 8,693,600 B2
(45) Date of Patent: Apr. 8, 2014

(54) PHASE EXCURSION/CARRIER WAVE FREQUENCY EXCURSION COMPENSATION DEVICE AND METHOD

(75) Inventor: Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/577,865

(22) PCT Filed: Feb. 4, 2011

(86) PCT No.: PCT/JP2011/052960
§ 371 (c)(1),
(2), (4) Date: Aug. 8, 2012

(87) PCT Pub. No.: WO2011/099589
PCT Pub. Date: Aug. 18, 2011

(65) Prior Publication Data
US 2012/0299629 A1    Nov. 29, 2012

(30) Foreign Application Priority Data

Feb. 9, 2010 (JP) .................................. 2010-026701

(51) Int. Cl.
*H03D 1/04* (2006.01)

(52) U.S. Cl.
USPC ............. 375/346; 327/236; 327/244; 331/25; 342/127; 375/226

(58) Field of Classification Search
None
See application file for complete search history.

(56) References Cited

U.S. PATENT DOCUMENTS

| 2006/0182015 | A1* | 8/2006 | Kim .............................. 370/203 |
| 2007/0268976 | A1* | 11/2007 | Brink et al. .................. 375/260 |
| 2008/0231941 | A1* | 9/2008 | Malouin et al. ............... 359/325 |
| 2008/0232823 | A1 | 9/2008 | Jansen et al. |
| 2010/0046961 | A1 | 2/2010 | Tanimura et al. |

FOREIGN PATENT DOCUMENTS

| JP | 2008-271527 A | 11/2008 |
| JP | 2009-194784 A | 8/2009 |
| JP | 2010-028470 A | 2/2010 |
| JP | 2010-050578 A | 3/2010 |

* cited by examiner

*Primary Examiner* — Adolf Dsouza
(74) *Attorney, Agent, or Firm* — Sughrue Mion, PLLC

(57) ABSTRACT

A phase excursion/carrier wave frequency excursion compensation device has a signal dividing unit, a preprocessing compensation circuit, post-processing compensation circuits, a signal combination unit, a correction amount calculation unit, and a signal correction unit. The preprocessing compensation circuit and the post-processing compensation circuits calculate a phase compensation amount with respect to the input signal, and output the phase compensation amount, and a compensation circuit output signal such that the input signal can be compensated accordingly. The signal combination unit acquires compensation circuit output signals from the post-processing compensation circuits and, based on order of input to the signal dividing unit, outputs rearranged signals. The correction amount calculation unit calculates a correction amount based on the phase compensation amount acquired from the preprocessing compensation circuit and the post-processing compensation circuits, and a signal correction unit corrects the phase of the rearranged signals using the correction amount.

10 Claims, 21 Drawing Sheets

FIG. 9

| A | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| B2 | 0 | | 0 | | 2 | | 4 | | 6 | | 8 | | 10 | | 12 | |
| C1 | 0 | | 0 | | 1 | | 3 | | 5 | | 7 | | 9 | | 11 | |
| C2 | 0 | | 0 | | 0 | | 2 | | 4 | | 6 | | 8 | | 10 | |

0    2T    4T    6T    8T    10T    12T    14T    16T → TIME

PHASE EXCURSION/CARRIER WAVE FREQUENCY EXCURSION COMPENSATION DEVICE AND METHOD

CROSS REFERENCE TO RELATED APPLICATION

This application is a National Stage of International Application No. PCT/JP2011/052960, filed on Feb. 4, 2011, which claims priority from Japanese Patent Application No. 2010-026701, filed Feb. 9, 2010, the contents of all of which are incorporated herein by reference in their entirety.

TECHNICAL FIELD

The present invention relates to phase excursion/carrier wave frequency excursion compensation devices and phase excursion/carrier wave frequency excursion compensation methods, in particular, to a phase excursion/carrier wave frequency excursion compensation device and a phase excursion/carrier wave frequency excursion compensation method which are used in optical communication systems.

BACKGROUND ART

Since the traffic volume of trunk communication systems has been drastically increasing due to widespread use of the Internet, there are great hopes that an ultra high speed optical communication system in excess of 40 Gbps will be practically implemented.

In recent years, as a technology to realize an ultra high speed optical communication system, optical phase modulation systems have been attracting much attention. Whereas data modulation is applied to the light intensity of transmission laser light in conventionally-used optical intensity modulation methods, data modulation is applied to the phase of transmission laser light in optical phase modulation systems. QPSK (Quadrature Phase Shift Keying) method, 8PSK (8-Phase Shift Keying) method and the like are known as optical phase modulation systems. In the optical phase modulation systems, the symbol rate (baud rate) can be lowered by allocating a plurality of bits to one symbol. As a result, an operation speed of electrical devices can be reduced and thus cutting of device production costs becomes possible. If QPSK scheme is used, for example, two bits (for example, 00, 01, 11, and 10) are allocated to each of four optical phases (for example, 45, 135, 225, and 315 degrees). As a result, the symbol rate in QPSK scheme can be reduced to one-half of the symbol rate in optical intensity modulation methods (that is, bit rate).

FIG. 15 is a diagram called a constellation map of QPSK in which four symbols of QPSK scheme and bit sequences allocated to each symbol are illustrated on a phase plane. The numerical values on the vertical axis and the horizontal axis correspond to values of the magnitude of amplitude in signal waveform multiplied by $10 \times 2^{1/2}$. Correlating a bit sequence to each symbol in the optical phase modulation system is called symbol mapping. Although the case will be described below where QPSK scheme is used as an optical phase modulation system, other optical phase modulation systems are also applicable.

To receive the signal light modulated with optical phase modulation, an optical coherent system is used. That is to say, laser light with almost the same optical frequency as that of signal light (which is called local light) and the signal light are coupled by an optical element called a 90-degree hybrid, and the output is received by an optical detector. In the following description, it is assumed for simplicity that each polarization state of the signal light and the local light is an identical linear polarization.

If the optical coherent system is used, an alternating current component of an electrical signal outputted from the optical detector is a beat signal composed of the signal light and the local light. The amplitude of the beat signal is proportional to light intensities of the signal light and the local light, and the phase of that is equal to the difference in the optical phase between the signal light and the local light provided that a carrier wave frequency of the signal light and an optical frequency of the local light are the same. At this time, if the optical phase of the local light is the same as that of laser light inputted into the optical modulator of an optical transmitter, the phase of the beat signal becomes equal to the optical phase applied to the laser light in the optical transmitter. Accordingly, it is possible that transmitted data are demodulated by transforming the phase of the beat signal into a bit sequence using symbol mapping. That is to say, if an optical signal with the constellation in FIG. 15 is transmitted from the optical transmitter, an optical receiver is able to receive a signal with the similar constellation.

However, in general, the value of the carrier wave frequency of the signal light does not completely coincide with that of the optical frequency of the local light. Moreover, the optical phase of the local light in the receiver does also not coincide with that of the laser light inputted into the optical modulator in the optical transmitter. Here, the optical phase difference between the laser light inputted into the optical modulator in the optical transmitter and the local light is called an optical phase excursion, and the difference between the carrier wave frequency of the signal light and the optical frequency of the local light is called an optical carrier wave frequency excursion.

FIGS. 16A and 16B show constellation maps in cases that there exist the optical phase excursion and the optical carrier wave frequency excursion. In these figures, the numerical values on the vertical axis and the horizontal axis correspond to values of the magnitude of amplitude in signal waveform multiplied by $10 \times 2^{1/2}$. As shown in FIG. 16A, if there exists an optical phase excursion, a signal is received which has a constellation rotated by the amount of the optical phase excursion compared to the constellation shown in FIG. 15. Since it is impossible to know the value of an optical phase excursion in advance, a problem arises that incorrect data are demodulated if a symbol is transformed into a bit sequence using the symbol mapping shown in FIG. 15 as it is.

If there is an optical carrier wave frequency excursion further, the phase of the above-described beat signal becomes equal to the value which is obtained by adding the optical phase excursion to the product of the optical carrier wave frequency excursion and the receipt time. As a result, as shown in FIG. 16B, a signal is received which has a constellation with the constellation shown in FIG. 15 rotating temporally. In this situation, since the phase of the beat signal varies temporally, it is impossible to demodulate the data out of the phase of the beat signal using the symbol mapping shown in FIG. 15. Therefore, in an optical phase modulation systems, a function for compensating a phase excursion and a carrier wave frequency excursion is required which prevents a constellation from rotating owing to an optical phase excursion and an optical carrier wave frequency excursion (refer to, for example, patent literature 1).

Patent Literature 1: Japanese Patent Application Laid-Open Publication No. 2008-271527 (paragraphs [0012]-[0030])

DISCLOSURE OF INVENTION

Problem to be Solved by the Invention

First, a process for compensating a phase excursion and a carrier wave frequency excursion will be described, which is widely used in optical phase modulation systems.

FIG. 17 shows a configuration of a related feedforward-type phase excursion/carrier wave frequency excursion compensation circuit 500 (it may sometimes be described as just "compensation circuit" below). An input signal of the compensation circuit 500 is divided into two signals, one of which is inputted to a phase compensation amount estimation circuit 510 which estimates a phase compensation amount, the other of which is inputted to a multiplier. The phase compensation amount estimation circuit 510 is composed of a phase error detection unit 511, a filter unit 512, and a phase compensation amount calculation unit 513.

The phase error detection unit 511 detects a change per unit time in an optical phase excursion, that is, a change in optical phase excursions between neighboring two symbols. In the phase error detection unit 511, M-th Power Algorithm shown in FIG. 18 has been widely used. Here, the change in optical phase excursions between neighboring two symbols is equal to a product of an optical carrier wave angular frequency excursion and one symbol time (one symbol time is equal to the reciprocal of a symbol rate). Since the symbol time is constant, it can be the that the phase error detection unit 511 is a circuit which calculates an optical carrier wave frequency excursion.

The output of the phase error detection unit 511 is sent to the filter unit 512, in which a noise component is removed. The output of the filter unit 512 is sent to the phase compensation amount calculation unit 513, in which an actual phase compensation amount, that is, the rotation amount of the constellation, is calculated. More specifically, the phase compensation amount calculation unit 513 is equivalent to an integration circuit. Finally, a product of the input signal and a complex number, which applies a reverse rotation corresponding to the phase compensation amount calculated by the phase compensation amount calculation unit 513 (expressed as exp (−iϕ), if the phase compensation amount is represented by ϕ), is outputted as a signal after compensation.

FIG. 19 shows an example of temporal change in a phase compensation amount estimated by the compensation circuit 500. In the time interval from 0 to 1T, phase compensation amounts are shown which correspond to each one of N number of symbols included in frame 1. As shown in FIG. 19, it can be seen that the phase compensation amounts temporally and continuously change.

As described above, in the related optical communication system using the optical phase modulation system, transmitted data is demodulated by preventing the constellation from rotating by using the feedforward-type phase excursion/carrier wave frequency excursion compensation circuit 500 shown in FIG. 17. Since the compensation circuit shown in FIG. 17 is generally executed by digital signal processing, the optical phase modulation system is also called an optical digital coherent system.

In the ultra high speed optical communication system in excess of 40 Gbps, the symbol rate is very high even if an optical phase modulation system is employed. Accordingly, to execute the compensation process in real time using the phase excursion/carrier wave frequency excursion compensation circuit 500 shown in FIG. 17, it is necessary that parallel processing is performed by parallelizing the compensation circuits. For example, in 40 Gbps optical communication system using QPSK scheme, the symbol rate is 20 Gsymbol/s, which far more exceeds the operation frequency, from a few 100 MHz to 1 GHz, of an LSI executing digital signal processing. If the operation frequency of the LSI is assumed to be 500 MHz, it is necessary to implement forty compensation circuits in the form of a parallel circuit. In the following, for simplicity, the case will be described below where the parallelization number of a compensation circuit is set at two.

FIG. 20 shows a configuration of a related doubly parallelized compensation circuit (hereinafter, referred to as a doubly parallelized compensation circuit). The related doubly parallelized compensation circuit 520 is composed of a signal dividing unit 521, a first compensation circuit 522-1, a second compensation circuit 522-2, and a signal combination unit 523. The signal dividing unit 521 divides an input signal of the doubly parallelized compensation circuit 520 into blocks with predetermined time intervals (referred to also as "frame" below), and distributes the frames to the first compensation circuit 522-1 and the second compensation circuit 522-2.

FIG. 21 is an example of timing diagrams of the related doubly parallelized compensation circuit 520. In this figure, frames are shown which the signal dividing unit 521 distributes to the first compensation circuit 522-1 and to the second compensation circuit 522-2 respectively, and the timing is also shown when each frame is distributed.

As shown in row A in this figure, the signal dividing unit 521 divides input signals into blocks (frames), each of which includes N number of symbols. Then, as shown in rows B and C, the signal dividing unit 521 alternately distributes the blocks to the first compensation circuit 522-1 (row B) and to the second compensation circuit 522-2 (row C) respectively. Here, 1T corresponds to N number of symbol times, that is, N times as long as one symbol time. The frame "0" is a data for timing adjustment, and all symbols included in the frame "0" are null symbols as signals. Therefore, each compensation circuit processes the frame "0" assuming that phase compensation amount for each symbol included in the frame "0" is equal to "0".

Both the first compensation circuit 522-1 and the second compensation circuit 522-2 have the same configuration as that of the phase excursion/carrier wave frequency excursion compensation circuit shown in FIG. 17. The signal combination unit 523 rearranges output signals of the first compensation circuit 522-1 and the second compensation circuit 522-2 according to the time ordering before being divided by the signal dividing unit 521, and outputs them.

FIG. 22 shows the time variation in an expected value of a phase compensation amount estimated by the related doubly parallelized compensation circuit. The vertical axis represents the value expected as a phase compensation amount estimated by the first compensation circuit 522-1 and the second compensation circuit 522-2, and the horizontal axis represents time. Here, the input signal into the signal dividing unit 521 (row A in FIG. 21) is the same as that into the compensation circuit 500 which is not parallelized, whose time variation in a phase compensation amount is shown in FIG. 19. In FIG. 22, solid lines represent expected values of phase compensation amounts estimated by the first compensation circuit 522-1, and dotted lines represent expected values of phase compensation amounts estimated by the second compensation circuit 522-2. As shown in FIG. 22, it is expected that phase compensation amounts estimated by the first compensation circuit 522-1 and the second compensation circuit 522-2 become equal to the estimated values of phase compensation amounts in cases that the compensation circuit is not parallelized shown in FIG. 19.

However, phase compensation amounts estimated by the related doubly parallelized compensation circuit 520 shown in FIG. 20 are, in fact, shown in FIG. 23. In FIG. 23, solid lines represent phase compensation amounts estimated by the first compensation circuit 522-1, and dotted lines represent phase compensation amounts estimated by the second compensation circuit 522-2. Further, dashed-dotted lines represent expected values of phase compensation amounts estimated by the first compensation circuit 522-1 or the second compensation circuit 522-2.

By FIG. 23, it can be seen that the estimated values of phase compensation amounts in the time interval from 0 to 1T coincide with the expected values. The estimated values of phase compensation amounts in the time interval from 1T to 2T are almost equal to the values obtained by translating the expected values so that a phase compensation amount at the time 1T will become "0". However, during certain little time just after the time 1T, there usually is slight difference between those phase compensation amounts because of the difference between their initial values.

The phase compensation amounts in the time interval from 2T to 3T are almost equal to the values obtained by translating the expected values of phase compensation amounts in the time interval from 2T to 3T. That is to say, the phase compensation amounts are almost equal to the values obtained by the translation so that the phase compensation amount at the time 2T will become equal to the last value of the phase compensation amounts in the time interval from 0 to 1T, that is, the phase compensation amount at the time 1T calculated by the first compensation circuit 522-1. However, during certain little time just after the time 2T, there exists slight difference between the estimated values and the expected values of phase compensation amounts because of the reason described above. The situation is the same with respect to subsequent phase compensation amounts.

The reason why the estimated values of phase compensation amounts disagree with expected values of them is because a phase compensation amount is calculated as an integral value of an optical phase excursion between neighboring symbols in the related phase excursion/carrier wave frequency excursion compensation circuit 500. Furthermore, it is because the last value of phase compensation amounts in the last frame, which is estimated by the first compensation circuit for example, cannot be set for the initial value of the second compensation circuit.

As described above, since phase compensation amounts estimated by the related doubly parallelized compensation circuit 520 shown in FIG. 20 disagree with the expected values, phase excursion/carrier wave frequency excursion cannot be compensated completely. However, phase compensation amounts estimated by the related doubly parallelized compensation circuit 520 are equal to the values obtained by just translating the corresponding expected values per one frame time interval (that is, N-fold symbol time=T). Therefore, the constellation can be prevented from rotating within each frame time interval. The problem is that the symbol mapping varies (rotates) every time a frame changes because of the discontinuous change in the estimated value of phase compensation amount at each frame boundary.

In order to solve the above-described problem, a method called a differential coding system is generally used. The differential coding system is a coding system in which a bit sequence is correlated to a transition between neighboring two symbols. FIG. 24 shows an example of QPSK constellation maps to which the differential coding system is applied. The numerical values on the vertical axis and the horizontal axis in this figure correspond to values of the magnitude of amplitude in signal waveform multiplied by $10\times2^{1/2}$. In the optical communication system using differential coding system, as shown in FIG. 24, a bit sequence is not correlated to a symbol itself, but a bit sequence is mapped on a transition from a certain symbol to the same or another symbol. For example, as shown in FIG. 24, it is possible to allocate a bit sequence [00] to the transition 1 in which a phase change between the neighboring symbols is +0 degree, a bit sequence [01] to the transition 2 with a phase change of +90 degrees, a bit sequence [11] to the transition 3 of +180 degrees, and a bit sequence [10] to transition 4 of +270 degrees, respectively.

FIG. 25 shows a configuration of a doubly parallelized compensation circuit 530 using the differential coding system in an optical communication system. It is the same configuration as that of the doubly parallelized compensation circuit 520 shown in FIG. 20 except that a differential decoding unit 531 is added to the subsequent stage of the signal combination unit 523.

FIG. 26 is an example of timing diagrams of the related doubly parallelized compensation circuit 530 using the differential coding system. In this figure, frames are shown which the signal dividing unit 521 distributes to the first compensation circuit 522-1 and to the second compensation circuit 522-2 respectively, and the timing is also shown when each frame is distributed.

As shown in row A in this figure, the signal dividing unit 521 divides input signals into frames, each of which includes N number of symbols. Then, as shown in rows B and C, the signal dividing unit 521 alternately distributes each frame to the first compensation circuit 522-1 (row B) and to the second compensation circuit 522-2 (row C) respectively. Here, although the frames distributed to the first compensation circuit 522-1 and the second compensation circuit 522-2 are basically the same as those in the timing diagram shown in FIG. 21, there is a difference that at least one symbol out of the tail end in the preceding frame is added to the head of each frame. For example, if the frame 2 is distributed to the second compensation circuit 522-2, the symbol at the tail end of the frame 1 is added to the head of the frame 2. Alternatively, it is possible that first one or more symbols in the subsequent frame are added to the tail end of the frame. The reason is that because of using the differential coding system, the transition between the head symbol in the frame and the preceding symbol of it, or the transition between the tail end symbol in the frame and the subsequent symbol of it is necessary for transforming a bit sequence.

FIG. 27 shows estimated values of phase compensation amounts by the doubly parallelized compensation circuit 530 using the differential coding system shown in FIG. 25. Although they are slightly different from the phase compensation amounts estimated by the doubly parallelized compensation circuit 520 shown in FIG. 23, it is the same that the expected values of phase compensation amounts are translated per one frame time interval. It is because the symbols in the vicinity of the tail end of the preceding frame are simply added in the case of using the doubly parallelized compensation circuit 530.

The signal combination unit 523 rearranges signals sent from the first compensation circuit 522-1 and the second compensation circuit 522-2 according to the time ordering by which those signals are inputted into the signal dividing unit 521. At that time, the frames are combined leaving only one of the symbols added to the head (or the tail end) in each frame.

The differential decoding unit 531 transforms a transition between neighboring symbols into a predetermined bit sequence, as described above. At that time, transmitted data can be decoded without any problem because the constellation is prevented from rotating within a frame, even though the constellation rotates per each frame, and because a bit sequence is correlated to a transition between neighboring symbols.

As described above, even though the phase excursion/carrier wave frequency excursion compensation process is implemented in the form of a parallel circuit, it is possible to decode transmitted data correctly by applying differential coding system.

However, if the phase excursion/carrier wave frequency excursion compensation process is performed by the above-described doubly parallelized compensation circuit using differential coding system, there is a problem as described below.

Since a bit sequence is allocated to a transition between neighboring symbols in the differential coding system, if an error occurs at one symbol, errors occur at both a transition from the preceding symbol and a transition to the subsequent symbol. As a result, if the differential code is used, there is a problem that the bit error ratio (BER) increases as compared to the case without using the differential code. The optical SNR (Signal-to-Noise Ratio), which is necessary for achieving the same transmission characteristics in the same optical communication system, theoretically becomes higher by 3 dB in the case of using the differential code. As a result, there occurs a problem that nonlinear optical effect due to increasing in optical intensity of optical signals causes deterioration in the transmission characteristics and reduction of the possible transmission distance.

As described above, in the related phase excursion/carrier wave frequency excursion compensation device, there is a problem that the transmission characteristics deteriorate if the compensation processing is made faster by using parallel processing.

The objective of the present invention is to provide a phase excursion/carrier wave frequency excursion compensation device and a phase excursion/carrier wave frequency excursion compensation method which solve the problem mentioned above that the transmission characteristics deteriorate if the compensation processing is made faster by using parallel processing.

Means for Solving a Problem

A phase excursion/carrier wave frequency excursion compensation device according to an exemplary aspect of the invention includes a signal dividing unit; a preprocessing compensation circuit; a plurality of post-processing compensation circuits; a signal combination unit; a correction amount calculation unit; and a signal correction unit; wherein the signal dividing unit divides inputted signals into frames with a predetermined time interval, and distributes the frames to the preprocessing compensation circuit and the plurality of post-processing compensation circuits; the preprocessing compensation circuit and the post-processing compensation circuits calculate phase compensation amounts for the inputted signals, and output the phase compensation amounts and compensation circuit output signals which are obtained by compensating the inputted signals with the phase compensation amounts; the signal combination unit outputs rearranged signals which are obtained by rearranging the compensation circuit output signals acquired from the post-processing compensation circuits according to the time ordering by which the inputted signals are inputted into the signal dividing unit; the correction amount calculation unit calculates a correction amount on the basis of the phase compensation amounts acquired from the preprocessing compensation circuit and the post-processing compensation circuits; and the signal correction unit corrects a phase of the rearranged signal by using the correction amount.

A phase excursion/carrier wave frequency excursion compensation method according to an exemplary aspect of the invention includes the steps of: dividing inputted signals into frames with a predetermined time interval; calculating first phase compensation amounts for the inputted signals included in a first frame of the frames; calculating second phase compensation amounts for the inputted signals included in a second frame subsequent to the first frame setting the first phase compensation amount for an initial value, and calculating compensation circuit output signals which are obtained by compensating the inputted signals with the second phase compensation amounts; outputting rearranged signals which are obtained by rearranging the compensation circuit output signals according to the order of the inputted signals; calculating a correction amount on the basis of the first phase compensation amounts and the second phase compensation amounts for the identical frame; and correcting a phase of the rearranged signal by using the correction amount.

Effect of the Invention

According to the phase excursion/carrier wave frequency excursion compensation device by the present invention, it is possible to perform fast compensation processing by using parallel processing without causing deterioration in the transmission characteristics.

BRIEF DESCRIPTION OF THE DRAWINGS

FIG. 9 is a timing diagram in distributing frames in the phase excursion/carrier wave frequency excursion compensation device in accordance with the second exemplary embodiment of the present invention.

DESCRIPTION OF EMBODIMENTS

The exemplary embodiments of the present invention will be described with reference to drawings below.

[The First Exemplary Embodiment]

Figure 1:
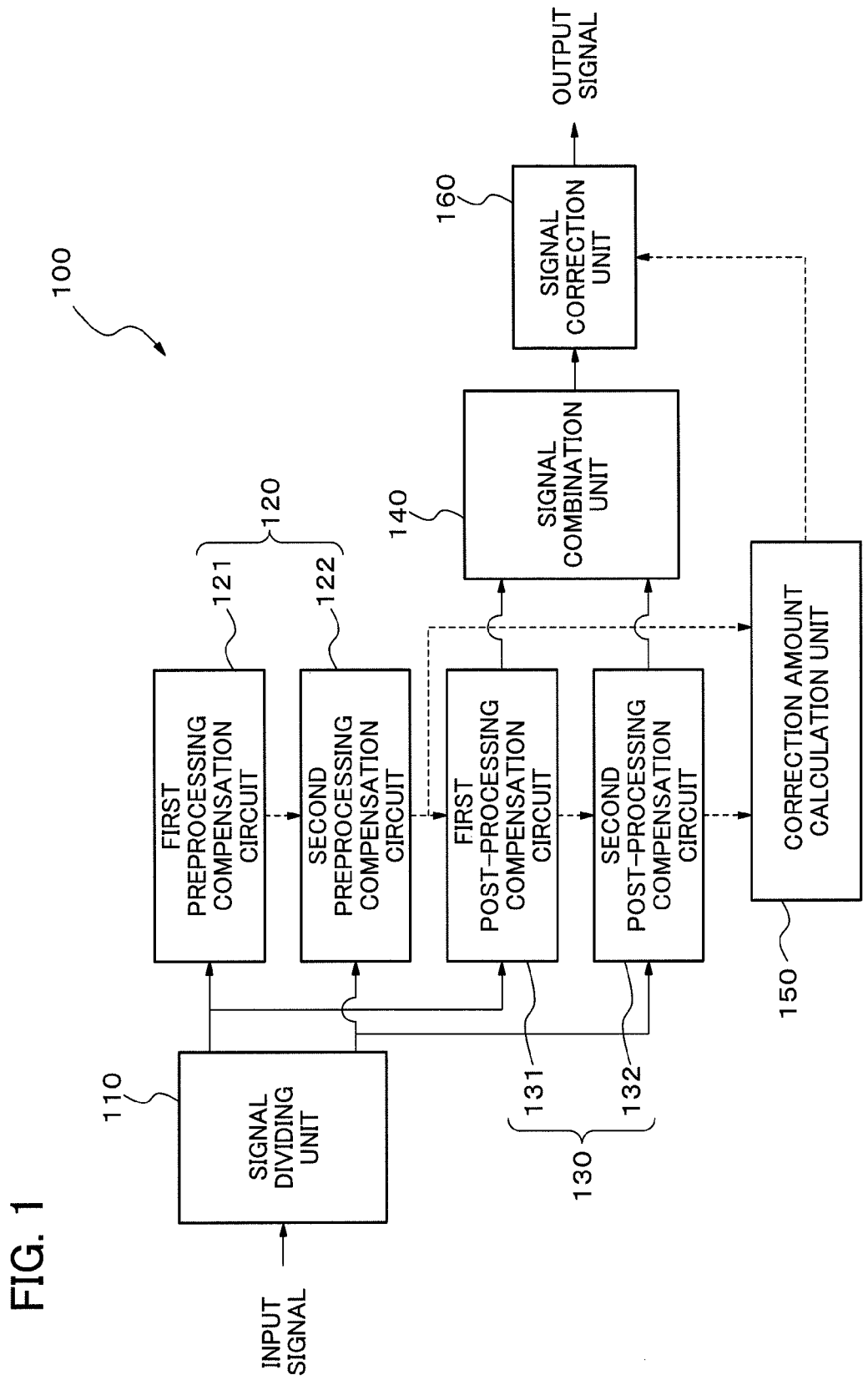
FIG. 1 is a block diagram showing a configuration of a phase excursion/carrier wave frequency excursion compensation device in accordance with the first exemplary embodiment of the present invention.

FIG. 1 is a block diagram showing the configuration of a phase excursion/carrier wave frequency excursion compensation device 100 in accordance with the first exemplary embodiment of the present invention. The phase excursion/carrier wave frequency excursion compensation device 100 has a signal dividing unit 110, a preprocessing compensation circuit 120, a plurality of post-processing compensation circuits 130, a signal combination unit 140, a correction amount calculation unit 150, and a signal correction unit 160. Input signals inputted into the signal dividing unit 110 are distributed to each of the preprocessing compensation circuits 120 and the plurality of post-processing compensation circuits 130, and the signal processing is parallelized by the plurality of post-processing compensation circuits 130. In FIG. 1, solid lines represent the flows of the input signals, and dotted lines represent the flows of phase compensation amounts.

The case will be described below where, as shown in FIG. 1, the post-processing compensation circuits 130 are provided with a first post-processing compensation circuit 131 and a second post-processing compensation circuit 132, and thus the parallelization number of the phase excursion/carrier wave frequency excursion compensation device is "2". However, the parallelization number is not limited to it, and the present invention is also available for the cases in which the parallelization number is set at "3" or more, as described below. In FIG. 1, the configuration is shown where the preprocessing compensation circuits 120 are also provided with a first preprocessing compensation circuit 121 and a second preprocessing compensation circuit 122. In the following description, the phase excursion/carrier wave frequency excursion compensation device 100 may sometimes be called a parallelized compensation device 100.

The signal dividing unit 110 divides input signals of the parallelized compensation device 100 into frames with a predetermined time interval, and distributes each frame to the first preprocessing compensation circuit 121 and the second preprocessing compensation circuit 122, and to the first post-processing compensation circuit 131 and the second post-processing compensation circuit 132, respectively.

The preprocessing compensation circuits 120 and the post-processing compensation circuits 130 estimate phase compensation amounts, and output the phase compensation amounts and compensation circuit output signals which are obtained by compensating the inputted signals with the estimated phase compensation amounts, as mentioned below. Among the plurality of post-processing compensation circuits 130, the first post-processing compensation circuit 131 acquires a phase compensation amount from the second preprocessing compensation circuit 122, and estimates phase compensation amounts for the inputted signals setting the acquired phase compensation amount for an initial value. The second post-processing compensation circuit 132 acquires a phase compensation amount from the first post-processing compensation circuit 131 as the other post-processing compensation circuit, and estimates phase compensation amounts for the inputted signals setting the acquired phase compensation amount for an initial value. Here, output signals of the first preprocessing compensation circuit 121 and the second preprocessing compensation circuit 122 are discarded, and output signals of the first post-processing compensation circuit 131 and the second post-processing compensation circuit 132 only are sent to the signal combination unit 140.

The signal combination unit 140 rearranges the compensation circuit output signals from the first post-processing compensation circuit 131 and the second post-processing compensation circuit 132 according to the time ordering by which those signals are inputted into the signal dividing unit 110, and outputs them as rearranged signals. The correction amount calculation unit 150 calculates a correction amount for a phase compensation amount by the phase compensation amounts transmitted from the second preprocessing compensation circuit 122 and the second post-processing compensation circuit 132, and transmits the correction amount to the signal correction unit 160. The signal correction unit 160 corrects phases of symbols included in the frame to which the rearranged signal corresponds using the correction amount transmitted from the correction amount calculation unit 150.

Figure 2:
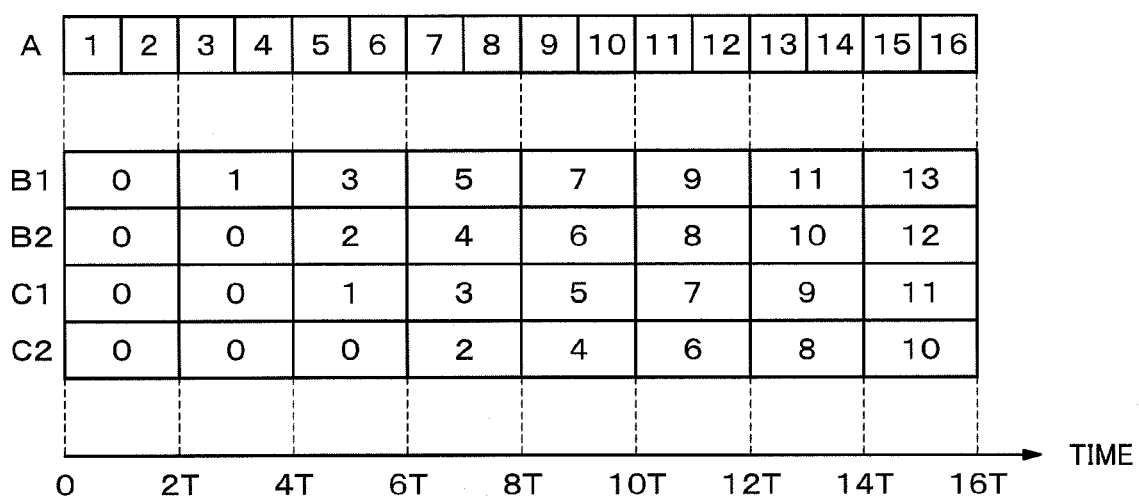
FIG. 2 is a timing diagram in distributing frames in the phase excursion/carrier wave frequency excursion compensation device in accordance with the first exemplary embodiment of the present invention.

FIG. 2 is an example of timing diagrams illustrating frames which the signal dividing unit 110 distributes to respective compensation circuits, and timings of distributing respective frames. As shown in row A in FIG. 2, the signal dividing unit 110 divides input signals into frames, each of which includes N number of symbols. And then, the signal dividing unit 110 distributes the frames to the first preprocessing compensation circuit 121 (row B1) and the second preprocessing compensation circuit 122 (row B2), and to the first post-processing compensation circuit 131 (row C1) and the second post-processing compensation circuit 132 (row C2), respectively. That is, the signal dividing unit repeats sequentially performing a process of firstly distributing frames to the preprocessing compensation circuits 120 and then distributing subsequent frames to the post-processing compensation circuits 130, per a processing time unit (which is equal to 2T in the case shown in FIG. 2).

Odd-numbered frames, which give a remainder of one if the frame numbers are divided by two, are distributed to the first preprocessing compensation circuit 121 and the first post-processing compensation circuit 131. And even-numbered frames, which give a remainder of zero if the frame numbers are divided by two, are distributed to the second preprocessing compensation circuit 122 and the second post-processing compensation circuit 132.

As shown in FIG. 2, the signal dividing unit 110 distributes each frame per the frame processing time unit 2T, at a timing when the frame number increases one by one, and in the order of the first preprocessing compensation circuit 121 (row B1), the second preprocessing compensation circuit 122 (row B2), the first post-processing compensation circuit 131 (row C1), and the second post-processing compensation circuit 132 (row C2). Here, 1T corresponds to N number of symbol times, that is, N times as long as one symbol time.

In particular, the signal dividing unit 110 distributes the frame "1" to the first preprocessing compensation circuit 121 during the time period from 2T to 4T (row B1), and distributes the frame "2" to the second preprocessing compensation circuit 122 during the time period from 4T to 6T (row B2). Then, it distributes the frame "3" to the first post-processing compensation circuit 131 during the time period from 6T to 8T (row C1), and lastly distributes the frame "4" to the second post-processing compensation circuit 132 during the time period from 8T to 10T (row C2). Here, the frame "0" is a frame for timing adjustment, and all symbols included in the frame "0" are null symbols as signals.

Figure 3:
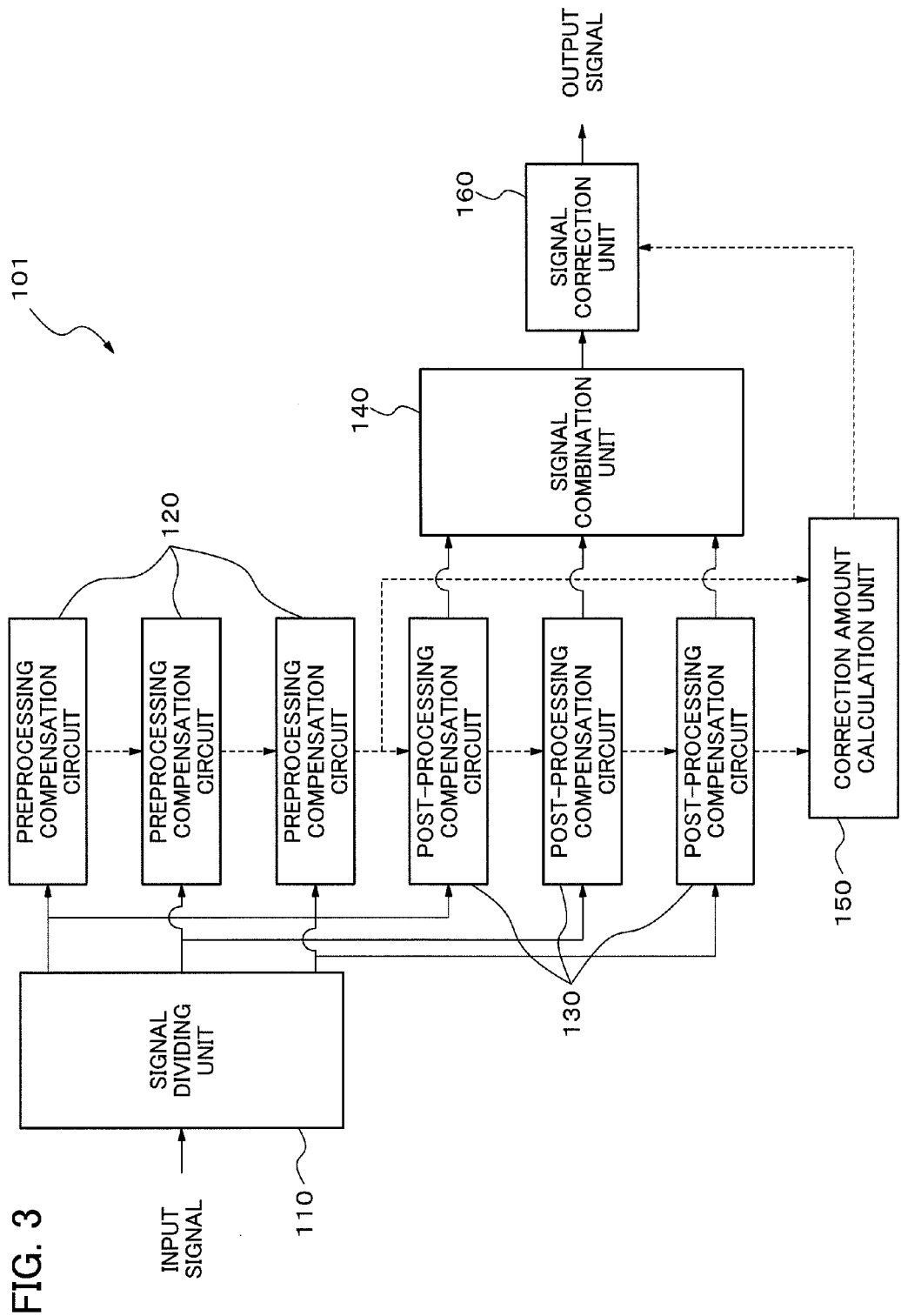
FIG. 3 is a block diagram showing a configuration of another phase excursion/carrier wave frequency excursion compensation device in accordance with the first exemplary embodiment of the present invention.
Figure 4:
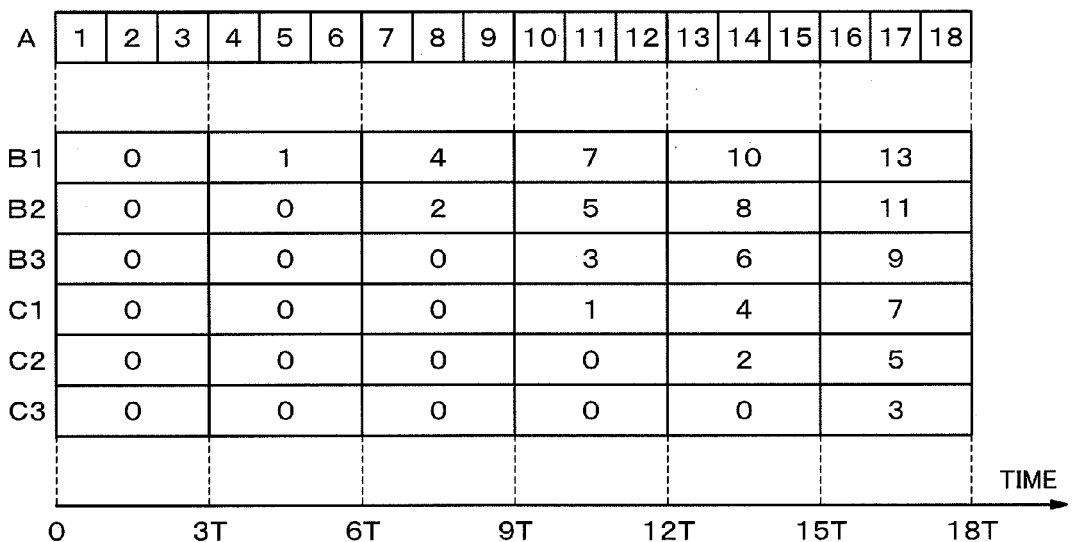
FIG. 4 is a timing diagram in distributing frames in another phase excursion/carrier wave frequency excursion compensation device in accordance with the first exemplary embodiment of the present invention.

Also in the case of a parallelized compensation device provided with three or larger number of preprocessing compensation circuits or of post-processing compensation circuits, each frame can be distributed to respective compensation circuits at a similar timing. FIG. 3 shows a configuration of a phase excursion/carrier wave frequency excursion compensation device (parallelized compensation device) 101 provided with three preprocessing compensation circuits 120 and three post-processing compensation circuits 130. Further, FIG. 4 shows an example of timing diagrams illustrating frames which the signal dividing unit 110 included in the parallelized compensation device 101 distributes to respective compensation circuits, and timings of distributing respective frames. As shown in this figure, in this case, the signal dividing unit 110 can distribute each frame per a frame processing time unit 3T.

Figure 5:
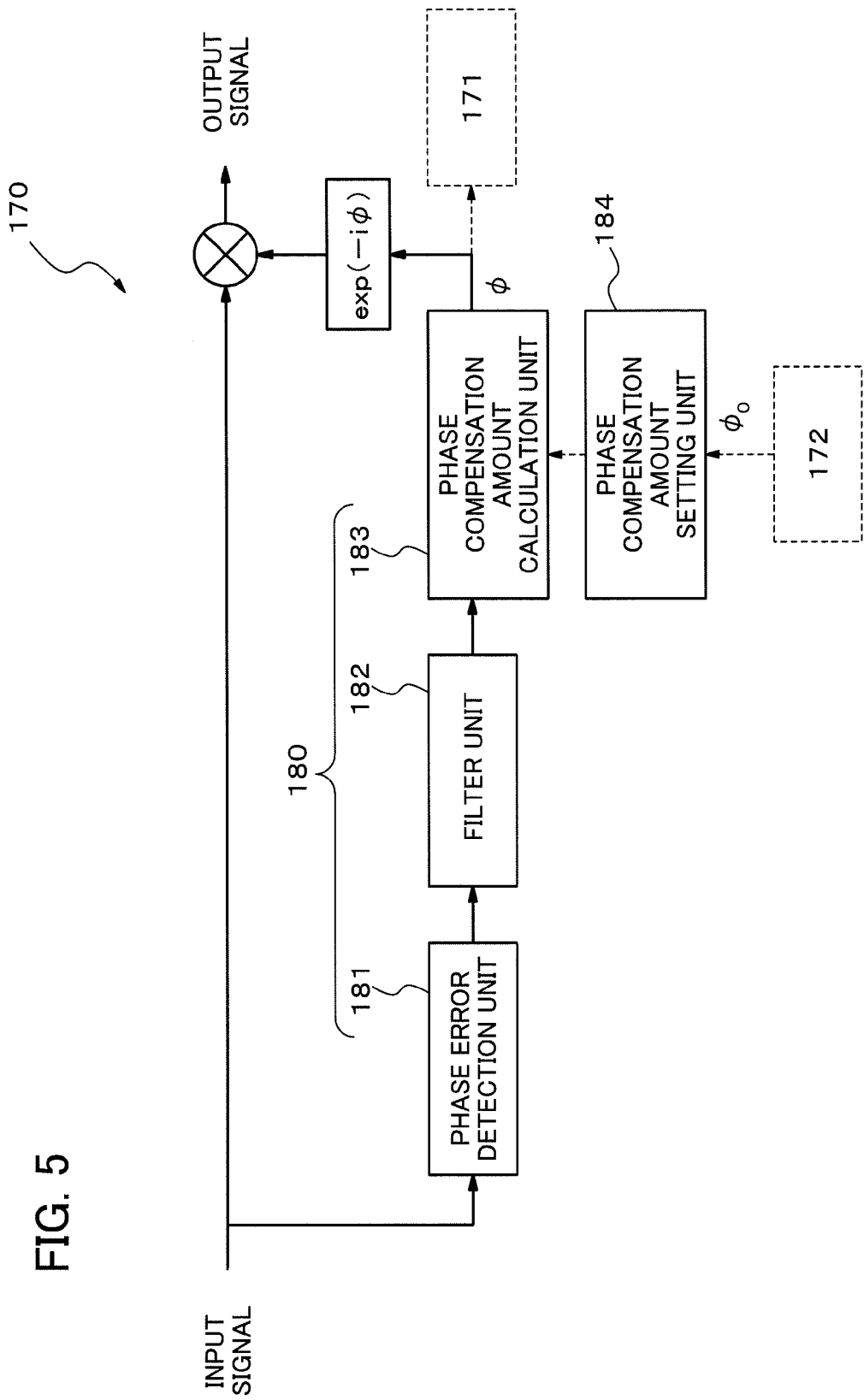
FIG. 5 is a block diagram showing a configuration of a pre/post-processing compensation circuit in accordance with the first exemplary embodiment of the present invention.

FIG. 5 shows a configuration of a pre/post-processing compensation circuit 170 which is commonly used as preprocessing compensation circuits 120 and post-processing compensation circuits 130 in the present exemplary embodiment. An input signal inputted into the pre/post-processing compensation circuit 170 is divided into two signals, one of which is inputted into a phase compensation amount estimation unit 180 estimating a phase compensation amount, the other of which is inputted into a multiplier. The phase compensation amount estimation unit 180 includes a phase error detection unit 181, a filter unit 182, a phase compensation amount calculation unit 183, and a phase compensation amount setting unit 184.

Figure 17:
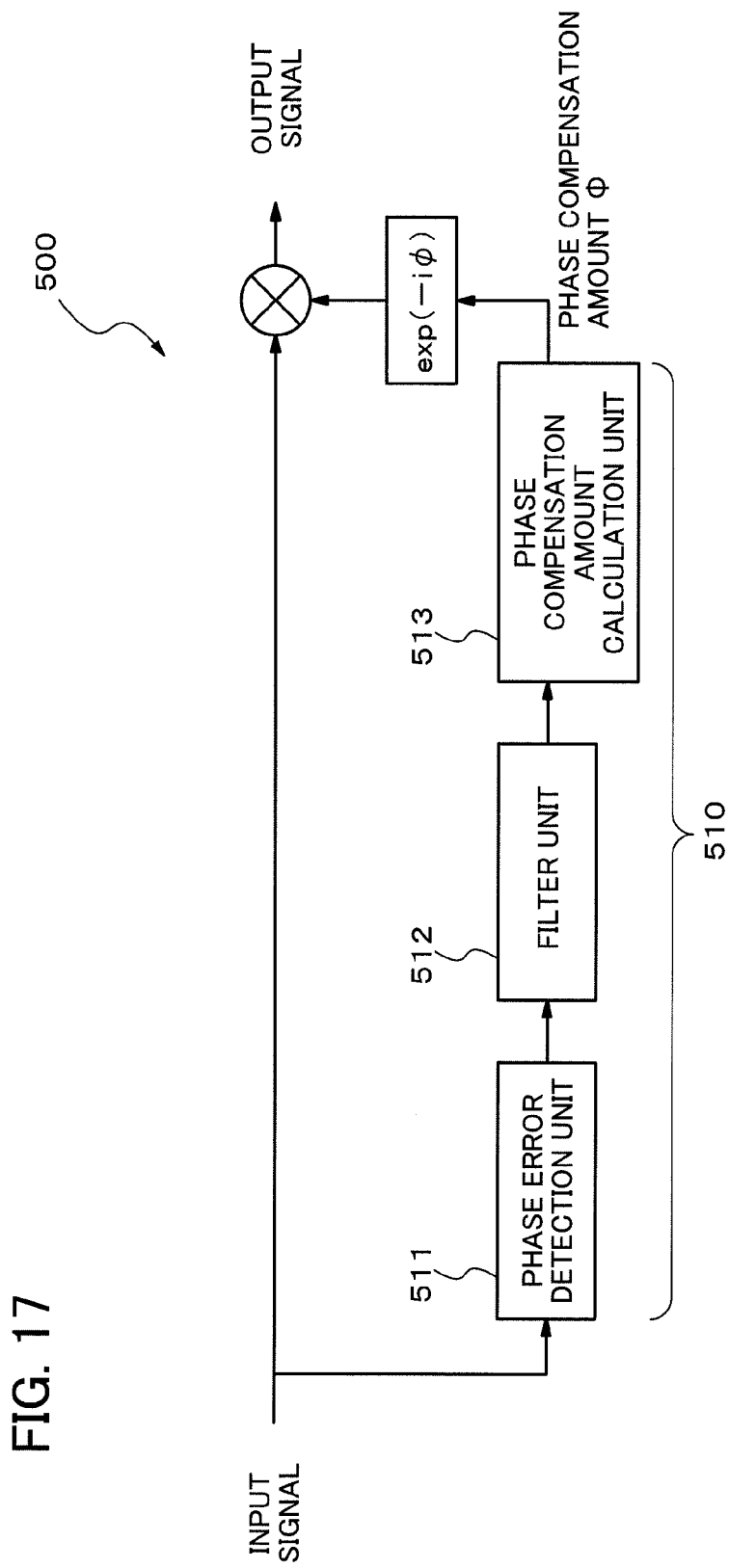
FIG. 17 is a block diagram showing a configuration of a related feedforward-type phase excursion/carrier wave frequency excursion compensation circuit.

The pre/post-processing compensation circuit 170 in the present exemplary embodiment has a different configuration from that in the related phase excursion/carrier wave frequency excursion compensation circuit 500 shown in FIG. 17 in that it is provided with the phase compensation amount setting unit 184. Further, the pre/post-processing compensation circuit 170 is configured so that a phase compensation amount φ estimated by the phase compensation amount estimation unit 180 can be transmitted to another pre/post-processing compensation circuit 171.

Figure 18:
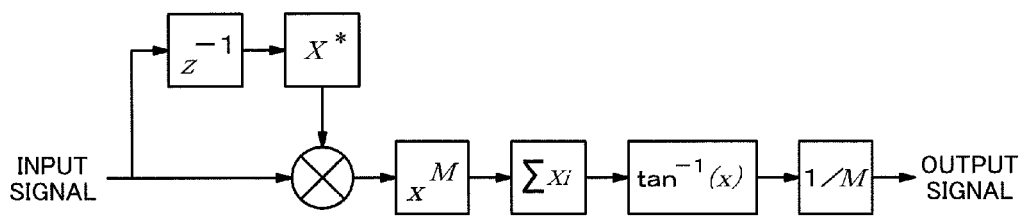
FIG. 18 is a block diagram showing a configuration of a related phase error detection unit.

The phase error detection unit 181 detects a change per unit time in a phase excursion, that is, a change in phase excursions between neighboring two symbols. In the phase error detection unit 181, M-th Power Algorithm shown in FIG. 18 can be used. The output of the phase error detection unit 181 is sent to the filter unit 182, in which a noise component is removed. The output of the filter unit 182 is sent to the phase compensation amount calculation unit 183, in which an actual phase compensation amount, that is, the rotation amount of the constellation, is calculated. More specifically, the phase compensation amount calculation unit 183 can be configured with an integration circuit.

The phase compensation amount setting unit 184 receives a phase compensation amount $\phi_0$ transmitted from another pre/post-processing compensation circuit 172. Then, it sets the $\phi_0$ value for the phase compensation amount calculation unit 183 as an initial value of phase compensation amount (an initial phase compensation amount) when the phase compensation amount calculation unit 183 starts the compensation process on the first symbol of a frame.

The pre/post-processing compensation circuit 170 outputs a product of the input signal and a complex number, which applies a reverse rotation corresponding to the phase compensation amount φ calculated by the phase compensation amount calculation unit 183 (expressed as exp (−iφ)) as a compensation circuit output signal of a signal after compensation.

Next, the operation of the parallelized compensation device 100 in accordance with the present exemplary embodiment will be described. As shown in FIG. 2, when the first preprocessing compensation circuit 121 receives symbols included in the frame "1" during the time interval from 2T to 4T (row B1), it estimates phase compensation amounts and performs the compensation of the input signals with the estimated phase compensation amounts. Here, an initial value of the phase compensation amount is invariably set for "0" in the first preprocessing compensation circuit 121. The first preprocessing compensation circuit 121 transmits the estimated phase compensation amounts to the second preprocessing compensation circuit 122.

The second preprocessing compensation circuit 122 receives the first symbol of the frame "2" at the time 4T (row B2). At that time, the phase compensation amount setting unit 184 in the second preprocessing compensation circuit 122 sets a phase compensation amount $\phi_0$ (a phase compensation amount for the last symbol of the frame "1") which is transmitted from the first preprocessing compensation circuit 121 at the time 4T as an initial value of the phase compensation amount. The phase compensation amount calculation unit 183 in the second preprocessing compensation circuit 122 estimates phase compensation amounts by using the initial value $\phi_0$ and performs the compensation of the input signals with the estimated phase compensation amounts. Here, as shown in FIG. 1, the second preprocessing compensation circuit 122 transmits the estimated phase compensation amounts to both the first post-processing compensation circuit 131 and the correction amount calculation unit 150. Since output signals of the first preprocessing compensation circuit 121 and the second preprocessing compensation circuit 122 are discarded as described above, it is acceptable that the phase compensation processing on the input signals is not performed if a feedforward-type compensation circuit is used.

Figure 6:
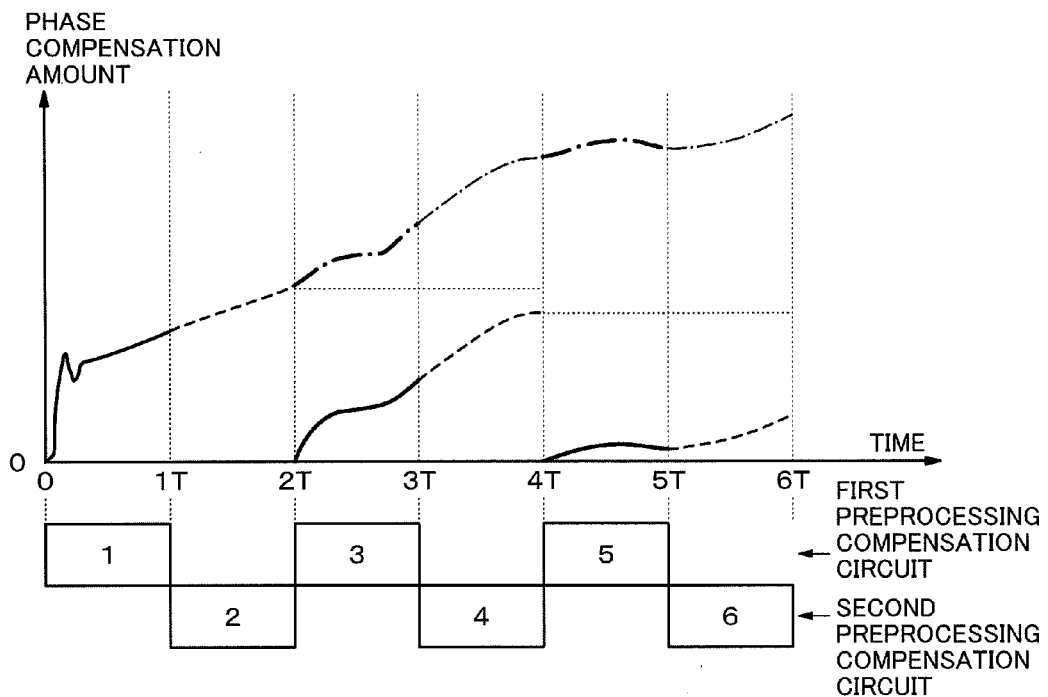
FIG. 6 is a diagram showing the time variation in a phase compensation amount estimated by preprocessing compensation circuits in accordance with the first exemplary embodiment of the present invention.
Figure 19:
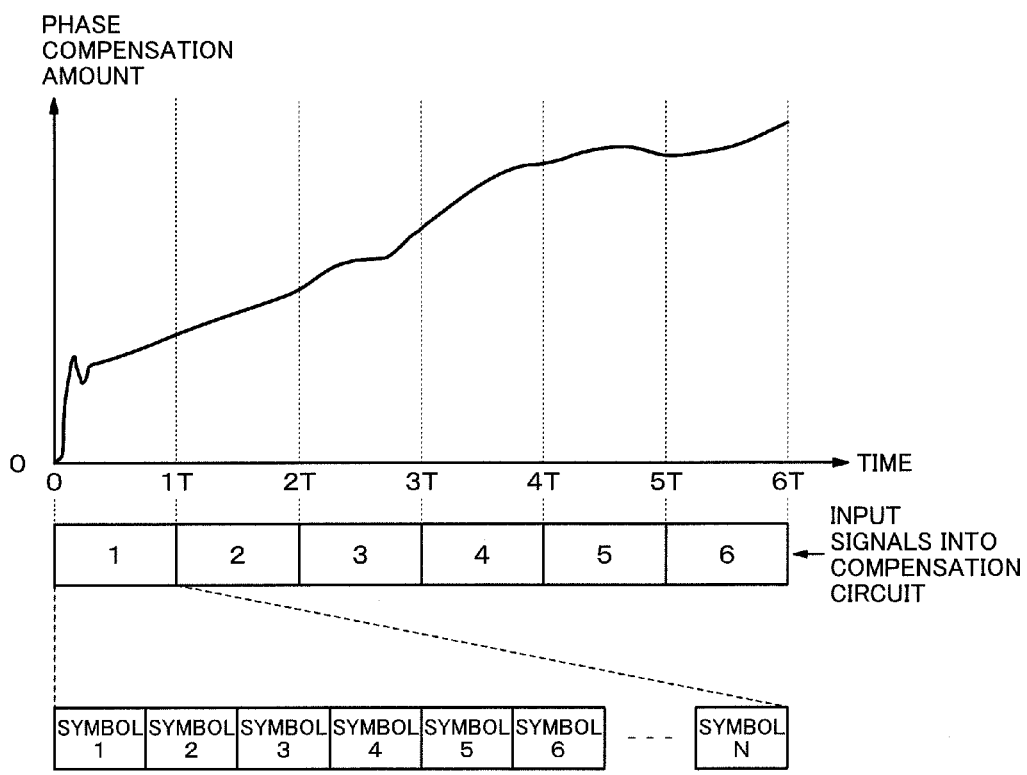
FIG. 19 is a diagram showing temporal changes in estimated values of phase compensation amounts.
Figure 20:
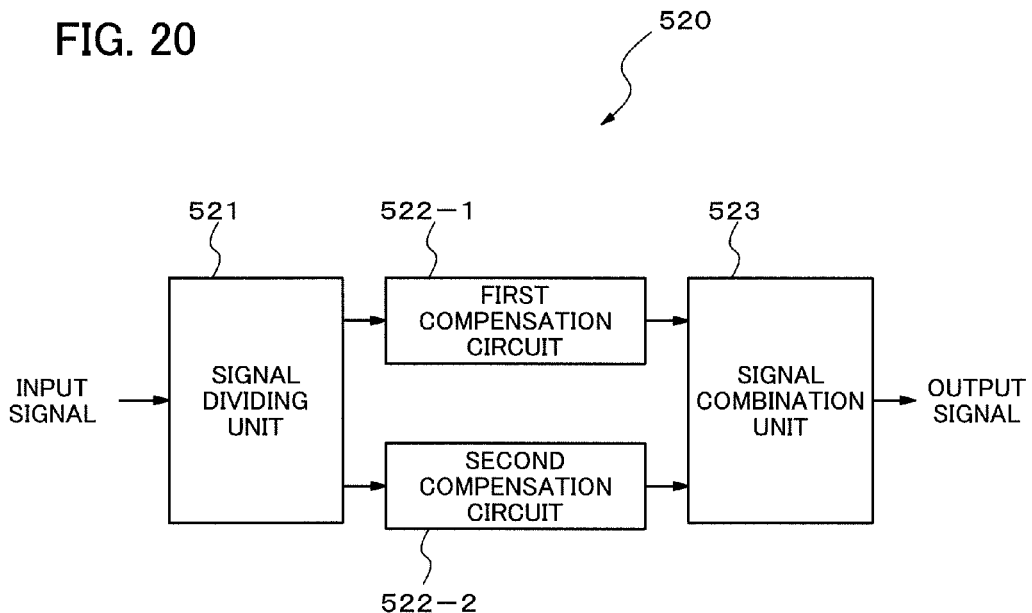
FIG. 20 is a block diagram showing a configuration of a related doubly parallelized compensation circuit.
Figure 21:
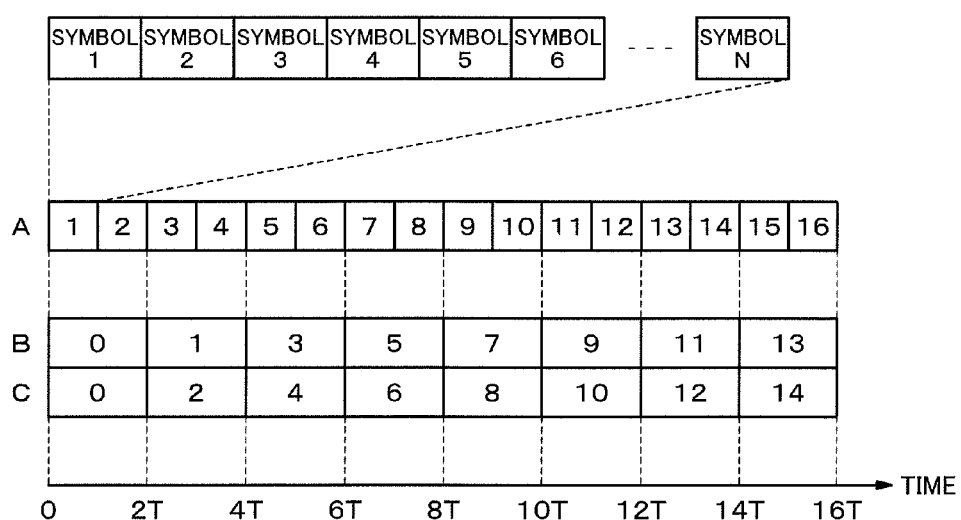
FIG. 21 is a timing diagram in distributing frames in the related doubly parallelized compensation circuit.
Figure 22:
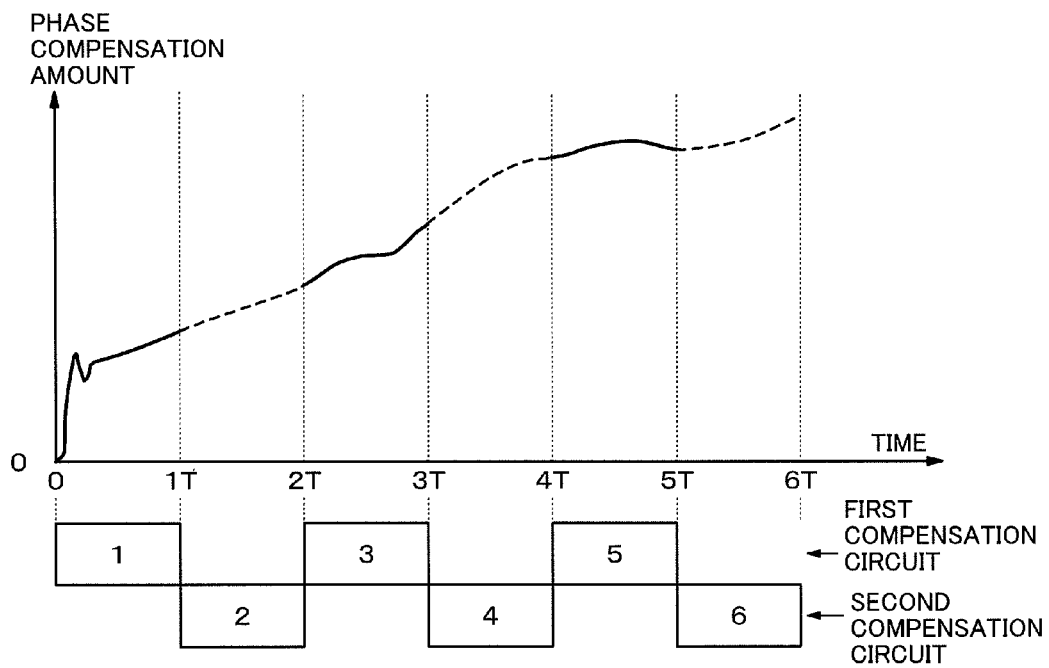
FIG. 22 is a diagram showing time variation in an expected value of a phase compensation amount estimated by the related doubly parallelized compensation circuit.
Figure 23:
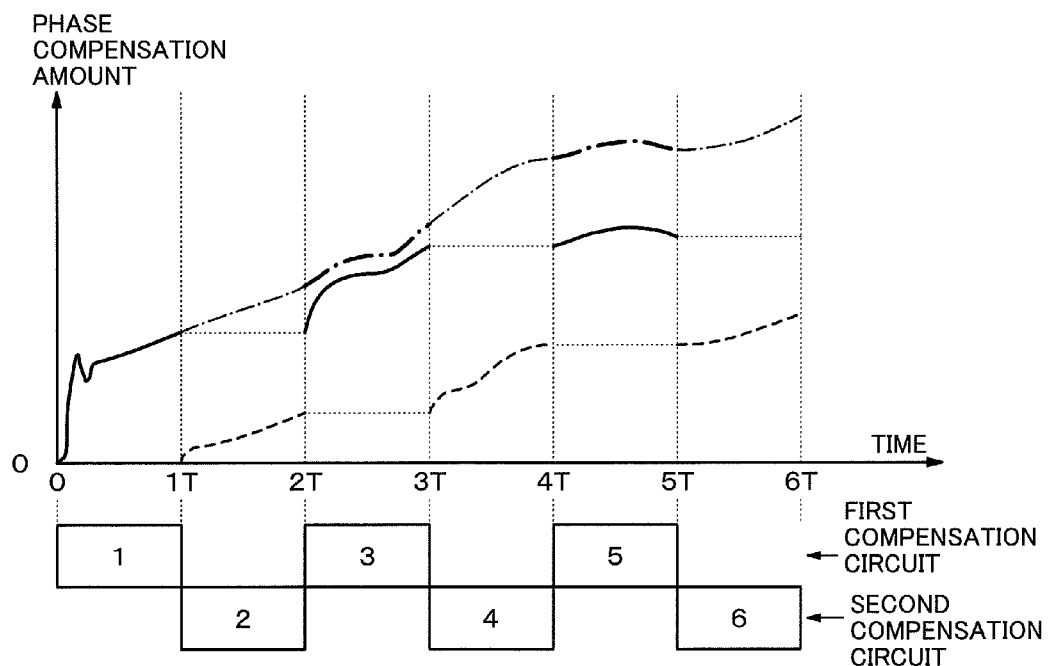
FIG. 23 is a diagram showing time variation in a phase compensation amount estimated by the related doubly parallelized compensation circuit.
Figure 24:
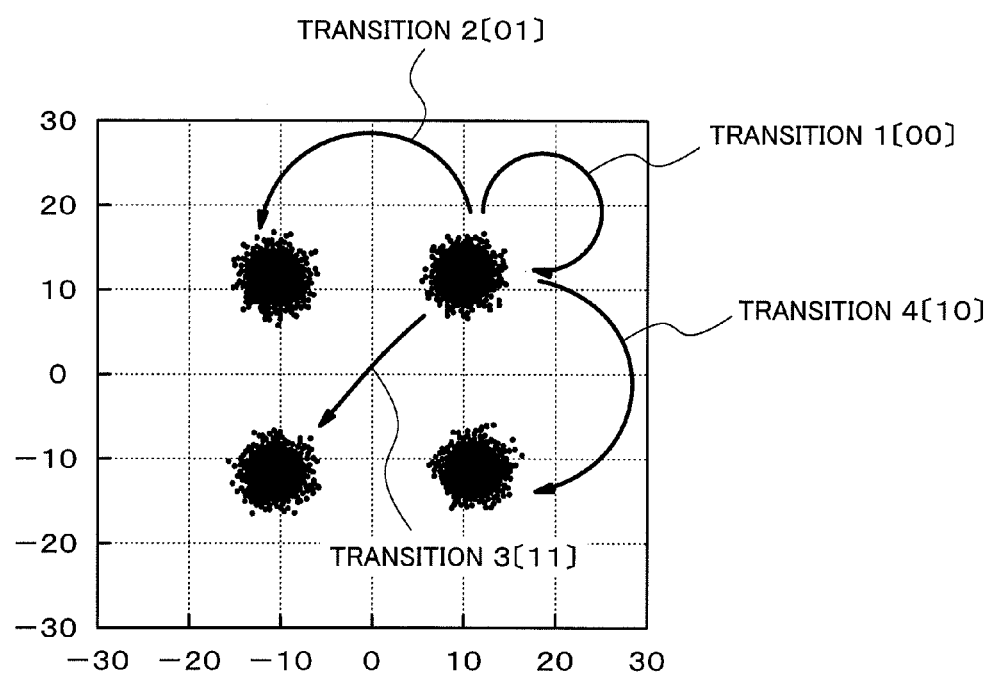
FIG. 24 is a diagram showing an example of QPSK constellation maps and symbol mapping to which the differential coding system is applied.
Figure 25:
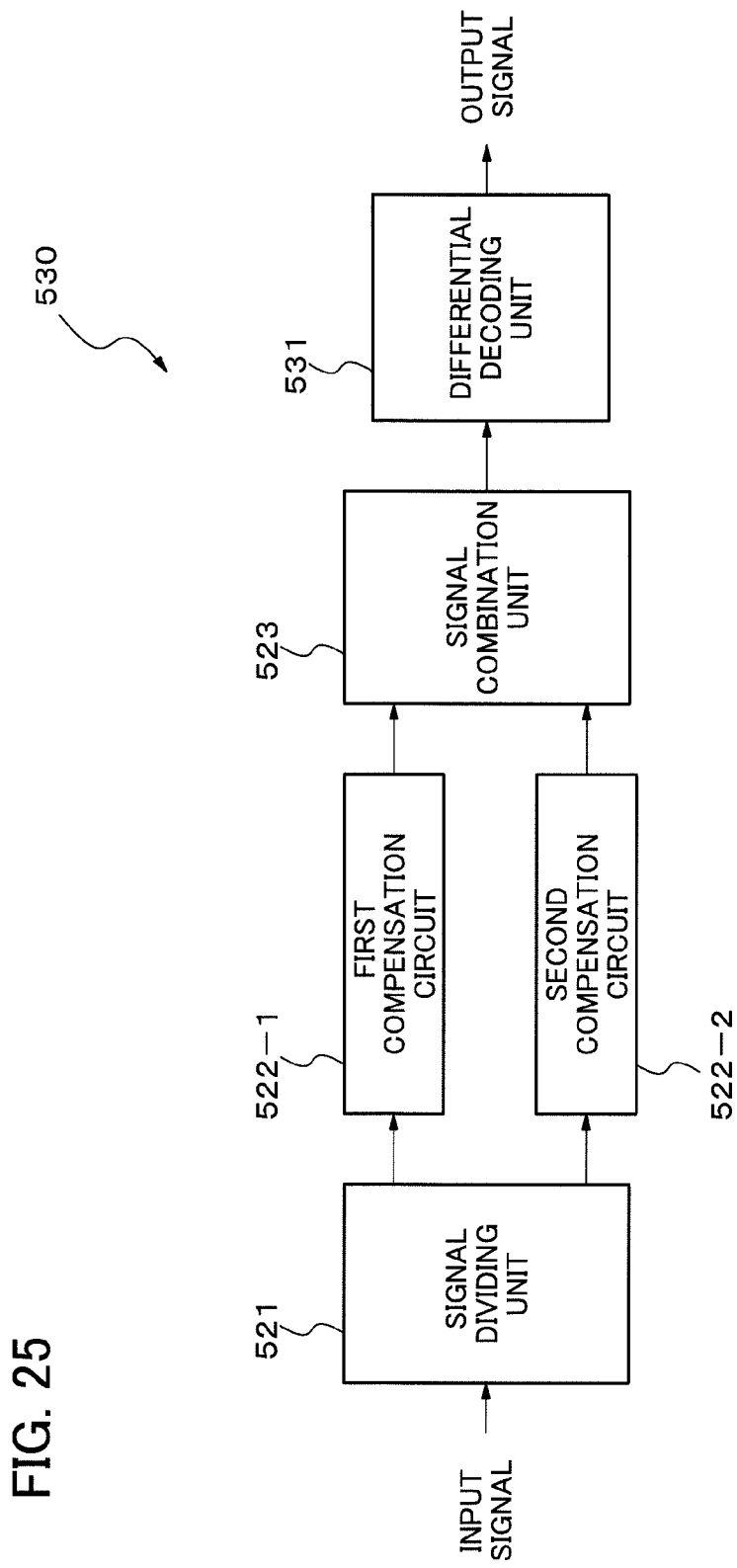
FIG. 25 is a block diagram showing a configuration of the related doubly parallelized compensation circuit using the differential coding system.
Figure 26:
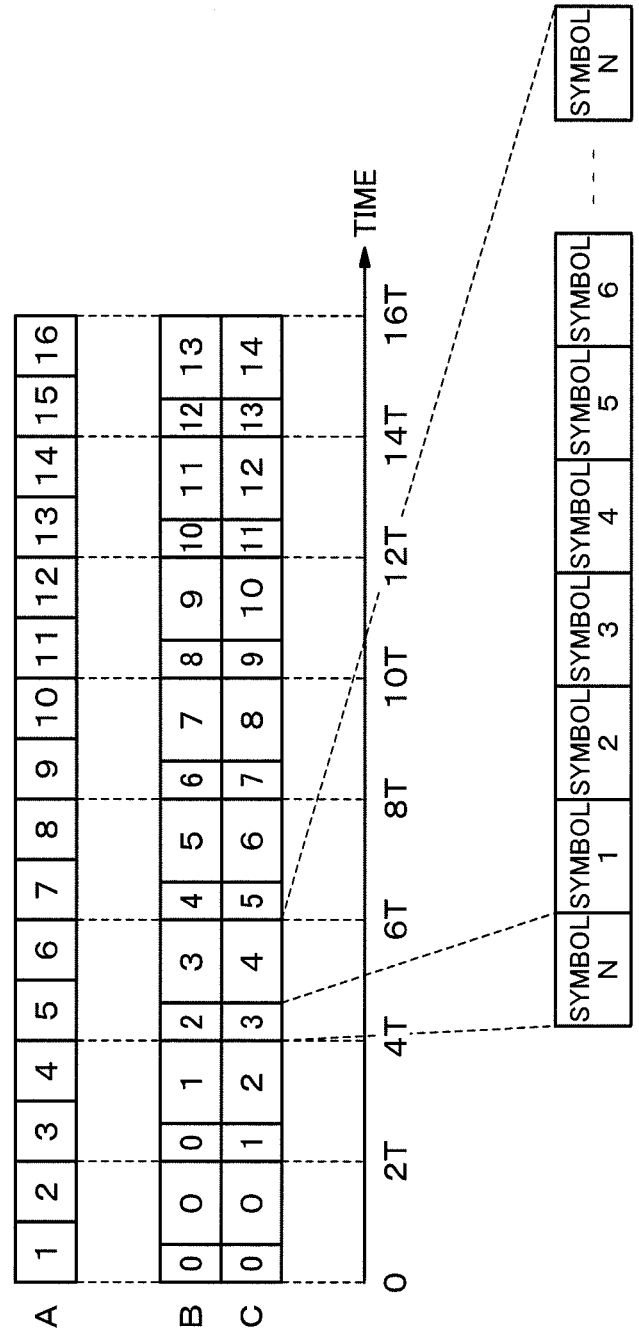
FIG. 26 is a timing diagram in distributing frames in the related doubly parallelized compensation circuit using the differential coding system.
Figure 27:
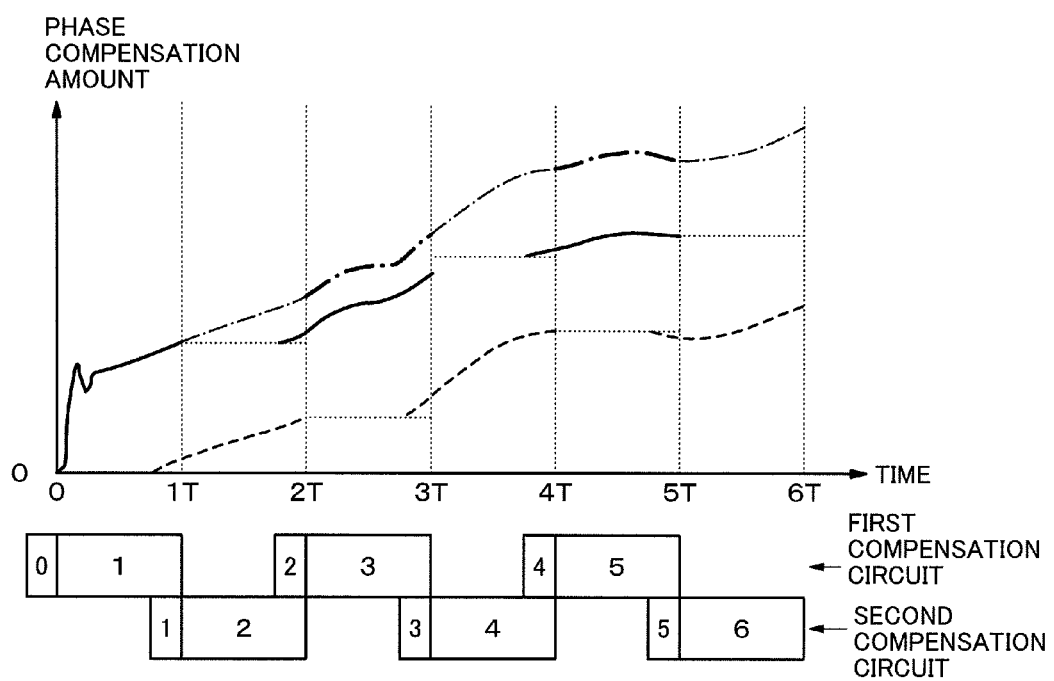
FIG. 27 is a diagram showing time variation in a phase compensation amount estimated by the related doubly parallelized compensation circuit using a differential coding system.

FIG. 6 shows the time variation in a phase compensation amount estimated by the first preprocessing compensation circuit 121 and the second preprocessing compensation circuit 122. Here, the input signals are the same as those in cases that phase compensation amounts are estimated using the compensation circuit 500 which is not parallelized (refer to FIG. 19). In this figure, solid lines represent phase compensation amounts estimated by the first preprocessing compensation circuit 121, and dotted lines represent phase compensation amounts estimated by the second preprocessing compensation circuit 122, respectively. Further, dashed-dotted lines represent expected values of the phase compensation amounts estimated by the first preprocessing compensation circuits 121 and the second preprocessing compensation circuit 122, respectively.

As shown in FIG. 6, the phase compensation amount estimated by the first preprocessing compensation circuit 121 is always "0" for the first symbol of a frame.

It is because, as described above, the initial value of the phase compensation amount is invariably set for "0" in the first preprocessing compensation circuit 121.

Here, the phase compensation amount estimated by the first preprocessing compensation circuit 121 for the tail end symbol of a frame is transmitted to the second preprocessing compensation circuit 122, and is set as an initial value of a phase compensation amount in the second preprocessing compensation circuit 122. As a result, the estimated values of phase compensation amounts for the symbols continuously vary temporally from the first symbol in odd-numbered frames processed by the first preprocessing compensation circuit 121 to the tail end symbol in the even-numbered frames processed by the second preprocessing compensation circuit 122. However, since the initial value of the phase compensation amount is invariably set for "0" in the first preprocessing compensation circuit 121, as described above, a phase compensation amount for the tail end symbol in an even-numbered frame and that for the first symbol in the odd-numbered frame are discontinuous.

On the other hand, the first post-processing compensation circuit 131 receives the first symbol in the frame "3" at the time 6T (refer to the row C1 in FIG. 2). At that time, the phase compensation amount setting unit 184 in the first post-processing compensation circuit 131 sets the phase compensation amount transmitted from the second preprocessing compensation circuit 122 at the time 6T (the phase compensation amount for the tail end symbol in the frame "2") as an initial value of a phase compensation amount. The first post-processing compensation circuit 131 estimates phase compensation amounts using that initial value, and it performs a process for compensating the input signals by using the estimated phase compensation amounts. After having finished this process, the first post-processing compensation circuit 131 outputs the signals resulting from compensating the input signals to the signal combination unit 140, and transmits the estimated phase compensation amounts to the second post-processing compensation circuit 132.

The second post-processing compensation circuit 132 receives the first symbol in the frame "4" at the time 8T (refer to the row C2 in FIG. 2). At that time, the phase compensation amount setting unit 184 in the second post-processing compensation circuit 132 sets the phase compensation amount transmitted from the first post-processing compensation circuit 131 at the time 8T (the phase compensation amount for the tail end symbol in the frame "3") as an initial value of a phase compensation amount. The second post-processing compensation circuit 132 estimates phase compensation amounts using that initial value, and it performs a process for compensating the input signals by using the estimated phase compensation amounts. After having finished this process, the second post-processing compensation circuit 132 outputs the signals resulting from compensating the input signals to the signal combination unit 140, and transmits the estimated phase compensation amounts to the correction amount calculation unit 150.

Figure 7:
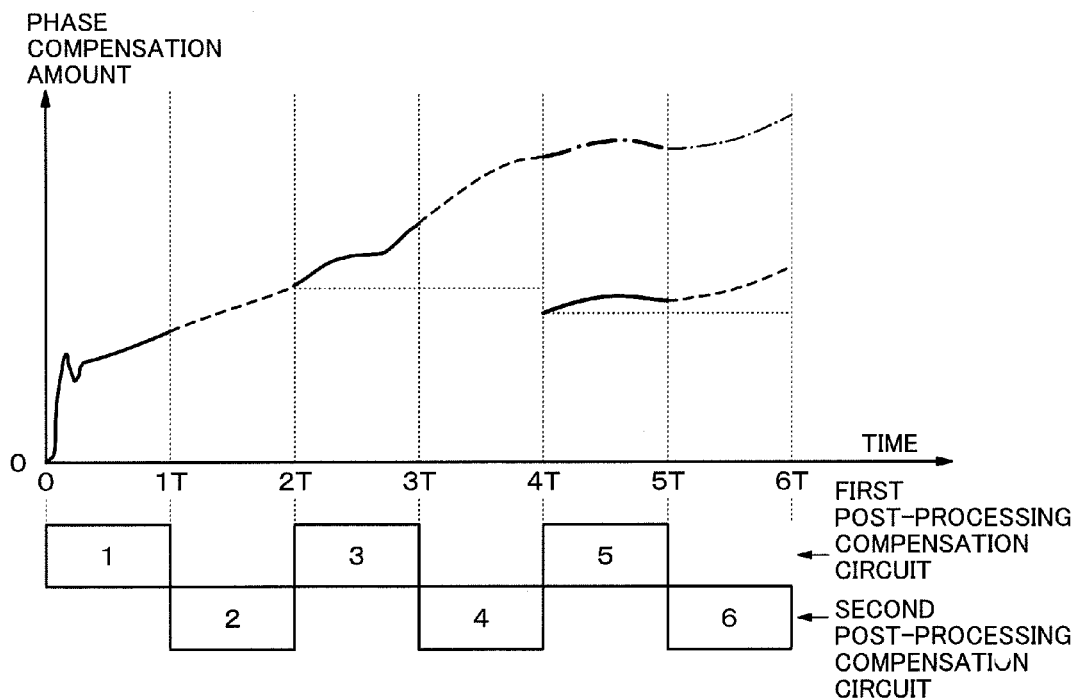
FIG. 7 is a diagram showing the time variation in a phase compensation amount estimated by post-processing compensation circuits in accordance with the first exemplary embodiment of the present invention.

FIG. 7 shows the time variation in phase compensation amounts estimated by the first post-processing compensation circuit 131 and the second post-processing compensation circuit 132. Here, as is the case in FIG. 6, the input signals are the same as those in cases that phase compensation amounts are estimated using the compensation circuit 500 which is not parallelized (refer to FIG. 19). In this figure, solid lines represent phase compensation amounts estimated by the first post-processing compensation circuit 131, and dotted lines represent phase compensation amounts estimated by the second post-processing compensation circuit 132, respectively. Further, dashed-dotted lines represent expected values of the phase compensation amounts estimated by the first post-processing compensation circuits 131 and the second post-processing compensation circuit 132, respectively.

As shown in FIG. 7, the phase compensation amounts, which the first post-processing compensation circuit 131 and the second post-processing compensation circuit 132 estimate for the symbols included in the frame 1 and the frame 2, coincide with the phase compensation amounts estimated by the first or the second preprocessing compensation circuits. It is because the first preprocessing compensation circuit 121 and the second preprocessing compensation circuit 122 process the frame "0", and the second preprocessing compensation circuit 122 transmits "0" as an initial value of a phase compensation amount to the first post-processing compensation circuit 131.

Next, the phase compensation amounts, which the first and the second post-processing compensation circuits estimate for the symbols included in the frame "3" and the frame "4", continuously connect at the time 2T with the phase compensation amounts which the first and the second preprocessing compensation circuits estimate for the frames "1" and "2". It is because the phase compensation amount which the second preprocessing compensation circuit 122 estimates for the tail end symbol in the frame "2" becomes the initial value of the phase compensation amount in the first post-processing compensation circuit 131.

As a result, as shown in FIG. 7, the estimated values of the phase compensation amounts, which are estimated by the first and the second post-processing compensation circuits for each symbol in the time interval from zero to 4T, coincide with their expected values. However, the estimated values of the phase compensation amounts, which are estimated by the first post-processing compensation circuit 131 and the second post-processing compensation circuit 132 for the symbols after the time 4T, come not to coincide with their the expected values. It is because the initial value of the phase compensation amount is invariably set for "0" in the first preprocessing compensation circuit 121.

Next, the operation of the correction amount calculation unit 150 will be described. First, the correction amount calculation unit 150 calculates the difference between phase compensation amounts Δφ which the second preprocessing compensation circuit 122 and the second post-processing compensation circuit 132 estimate for arbitrary identical symbols included in the identical frame (for example, the tail end symbol). And then, the correction amount calculation unit 150 calculates a total sum Sa of the difference between phase compensation amounts Δφ up to an arbitrary frame "a" which the second post-processing compensation circuit 132 processes. The correction amount calculation unit 150 outputs this total Sa as a correction amount for the symbols included in the frame which the second post-processing compensation circuit 132 processes subsequently to the frame "a" and in the previous frame of the frame "a" which the first post-processing compensation circuit 131 processes. Here, the initial value of the correction amount is assumed to be "0".

For example, a correction amount of the phase compensation amounts for the symbols included in the frame "1" and the frame "2" becomes "0". It is because the difference becomes "0" between the phase compensation amounts which the second preprocessing compensation circuit 122 estimates for the tail end symbol in the frame "0" and those which the second post-processing compensation circuit 132 estimates for the tail end symbol in the frame "0".

Further, a correction amount of the phase compensation amounts for the symbols included in the frame "3" and the frame "4" can be obtained as follows. The difference becomes "0" between the phase compensation amounts which the second preprocessing compensation circuit 122 estimates for the tail end symbol in the frame "2" and those which the second post-processing compensation circuit 132 estimates for the tail end symbol in the frame "2". Since a value resulting from adding, to this value, the above-mentioned correction amount "0" of the phase compensation amounts for the symbols included in the frame "1" and the frame "2" is a correction amount to be obtained, the correction amount becomes "0". This coincides with the fact that the estimated values of phase compensation amounts for respective symbols in the time interval from zero to 4T are coincident with their expected values, as shown in FIG. 7.

Next, a correction amount of the phase compensation amount for the symbols included in the frame "5" and the frame "6" will be described. The difference does not become "0" between the phase compensation amounts which the second preprocessing compensation circuit 122 estimates for the tail end symbol in the frame "4" and those which the second post-processing compensation circuit 132 estimates for the tail end symbol in the frame "4". A correction amount to be obtained is a value resulting from adding, to this difference of phase compensation amounts, the above-mentioned correction amount "0" of the phase compensation amounts for the symbols included in the frame "3" and the frame "4". The correction amount of the phase compensation amounts for each of subsequent frames can be similarly obtained.

As described above, the reason why a correction amount of a phase compensation amount can be obtained by calculation is as follows. That is to say, it is because each estimated value of a phase compensation amount is almost equal to a value obtained by translating its expected value, and the amount of the translation per frame is equal to the difference between phase compensation amounts which the second preprocessing compensation circuit 122 estimates and those which the second post-processing compensation circuit 132 estimates for the identical symbol included in the identical frame.

The signal correction unit 160 performs a process of adding or subtracting the correction amount which is transmitted from the correction amount calculation unit 150 to or from the phase of the symbol included in the frame corresponding to the correction amount. Accordingly, the signal correction unit 160 is able to output a signal compensated with the expected values of the phase compensation amounts for those symbols.

In the above description, it is assumed that a correction amount is calculated by using a phase compensation amount for the tail end symbol of each frame. However, without limited to this, any phase compensation amount can be used in the present exemplary embodiment as long as it is obtained for a symbol which is within a range that estimated values of phase compensation amounts are equal to the values obtained by translating their expected values. Further, it is known that the difference between phase compensation amounts for the identical symbol in the identical frame is always equal to an integral multiple of $2\pi/M$ radians. Accordingly, it is possible to prevent an error in a correction amount from occurring by performing a fractional process of rounding off the difference between phase compensation amounts to the nearest value among integral multiples of $2\pi/M$ radians. Here, M represents the order number of multiplication in phase modulation systems, where M=4 for QPSK scheme and M=8 for 8PSK scheme.

As described above, according to the phase excursion/carrier wave frequency excursion compensation device (parallelized compensation device) 100 by the present exemplary embodiment, because it is unnecessary to use a differential coding system, it is possible to perform fast compensation processing by using parallel processing without causing deterioration in the transmission characteristics.

[The Second Exemplary Embodiment]

Figure 8:
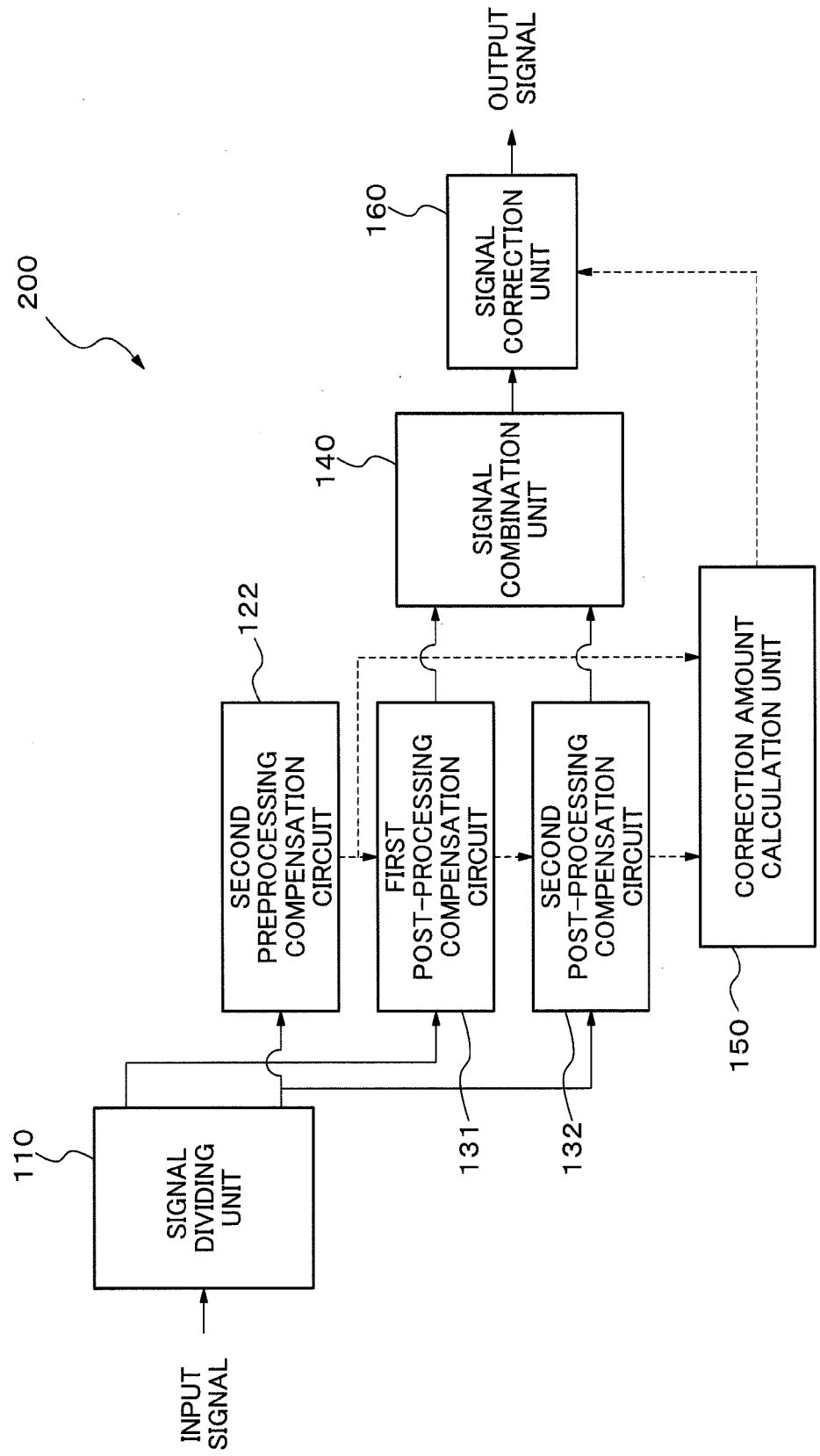
FIG. 8 is a block diagram showing a configuration of a phase excursion/carrier wave frequency excursion compensation device in accordance with the second exemplary embodiment of the present invention.

Next, the second exemplary embodiment of the present invention will be described. FIG. 8 is a block diagram showing the configuration of a phase excursion/carrier wave frequency excursion compensation device 200 in accordance with the second exemplary embodiment of the present invention. The configuration of the phase excursion/carrier wave frequency excursion compensation device 200 is different in the lack of the first preprocessing compensation circuit 121 from that of the phase excursion/carrier wave frequency excursion compensation device 100 in accordance with the first exemplary embodiment, and the other configuration is the same. In the following description, the phase excursion/carrier wave frequency excursion compensation device 200 may sometimes be called a parallelized compensation device 200.

FIG. 9 is an example of timing diagrams illustrating frames which the signal dividing unit 110 in the present exemplary embodiment distributes to respective compensation circuits, and timings of distributing respective frames. As shown in row A in FIG. 9, the signal dividing unit 110 divides input signals into frames, each of which includes N number of symbols. And then, it distributes the frames to the second preprocessing compensation circuit 122 (row B2), and to the first post-processing compensation circuit 131 (row C1) and the second post-processing compensation circuit 132 (row C2), respectively. As can be seen from FIGS. 2 and 9, the method by which the signal dividing unit 110 distributes input signals in the present exemplary embodiment is the same as that in the first exemplary embodiment, except that signals are not distributed to the first preprocessing compensation circuit 121. Further, the operation of each compensation circuit is the same as that in the first exemplary embodiment, except that an initial value of a phase compensation amount, that is, a phase compensation amount for the first symbol of a frame, is "0" for the second preprocessing compensation circuit 122.

Figure 10:
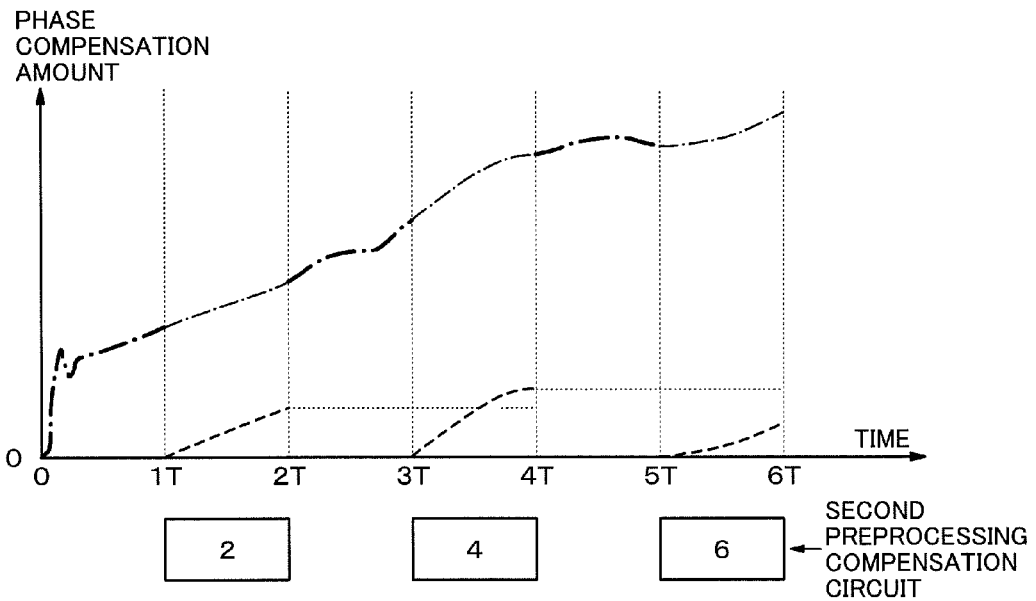
FIG. 10 is a diagram showing the time variation in a phase compensation amount estimated by the preprocessing compensation circuit in accordance with the second exemplary embodiment of the present invention.
Figure 11:
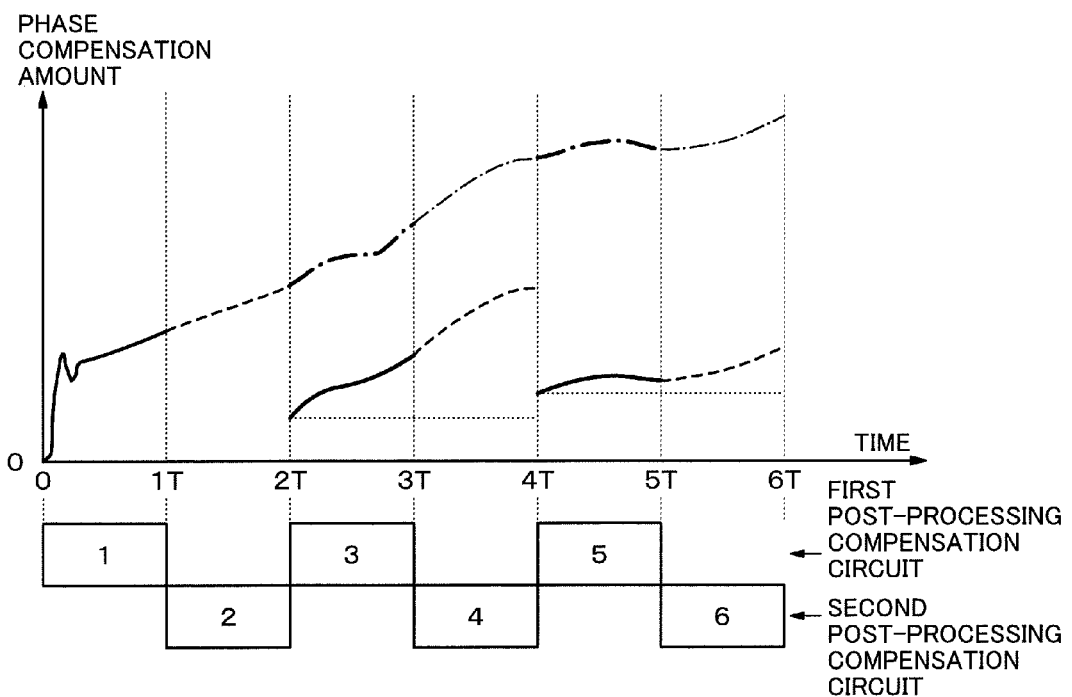
FIG. 11 is a diagram showing the time variation in a phase compensation amount estimated by post-processing compensation circuits in accordance with the second exemplary embodiment of the present invention.

FIG. 10 shows the time variation in a phase compensation amount estimated by the second preprocessing compensation circuit 122. FIG. 11 shows the time variation in a phase compensation amount estimated by the first post-processing compensation circuit 131 and the second post-processing compensation circuit 132. Here, as with the first exemplary embodiment, the input signals are the same as those in cases that phase compensation amounts are estimated using the compensation circuit 500 which is not parallelized (refer to FIG. 19). In FIG. 10, dotted lines represent phase compensation amounts estimated by the second preprocessing compensation circuit 122. In FIG. 11, solid lines represent phase compensation amounts estimated by the first post-processing compensation circuit 131, and dotted lines represent phase compensation amounts estimated by the second post-processing compensation circuit 132. Further, in FIGS. 10 and 11, dashed-dotted lines represent expected values of phase compensation amounts estimated by the respective compensation circuits.

As can be seen from FIG. 11, in the parallelized compensation device 200 in accordance with the present exemplary embodiment, estimated values of phase compensation amounts come not to coincide with the expected values after the time 2T. However, as with the parallelized compensation device 100 in accordance with the first exemplary embodiment, the parallelized compensation device 200 is configured to correct a phase of an output signal after calculating a correction amount for a phase compensation amount. Accordingly, it is possible to correct a discrepancy between an estimated value of a phase compensation amount and its expected value, and thus to perform fast compensation processing by using parallel processing without causing deterioration in the transmission characteristics.

According to the present exemplary embodiment, since it is unnecessary to compose the first preprocessing compensation circuit 121 in the first exemplary embodiment, the circuit size can be reduced. As a result, fast compensation processing by using parallel processing can be realized with low power consumption and low manufacturing costs.

[The Third Exemplary Embodiment]

Figure 12:
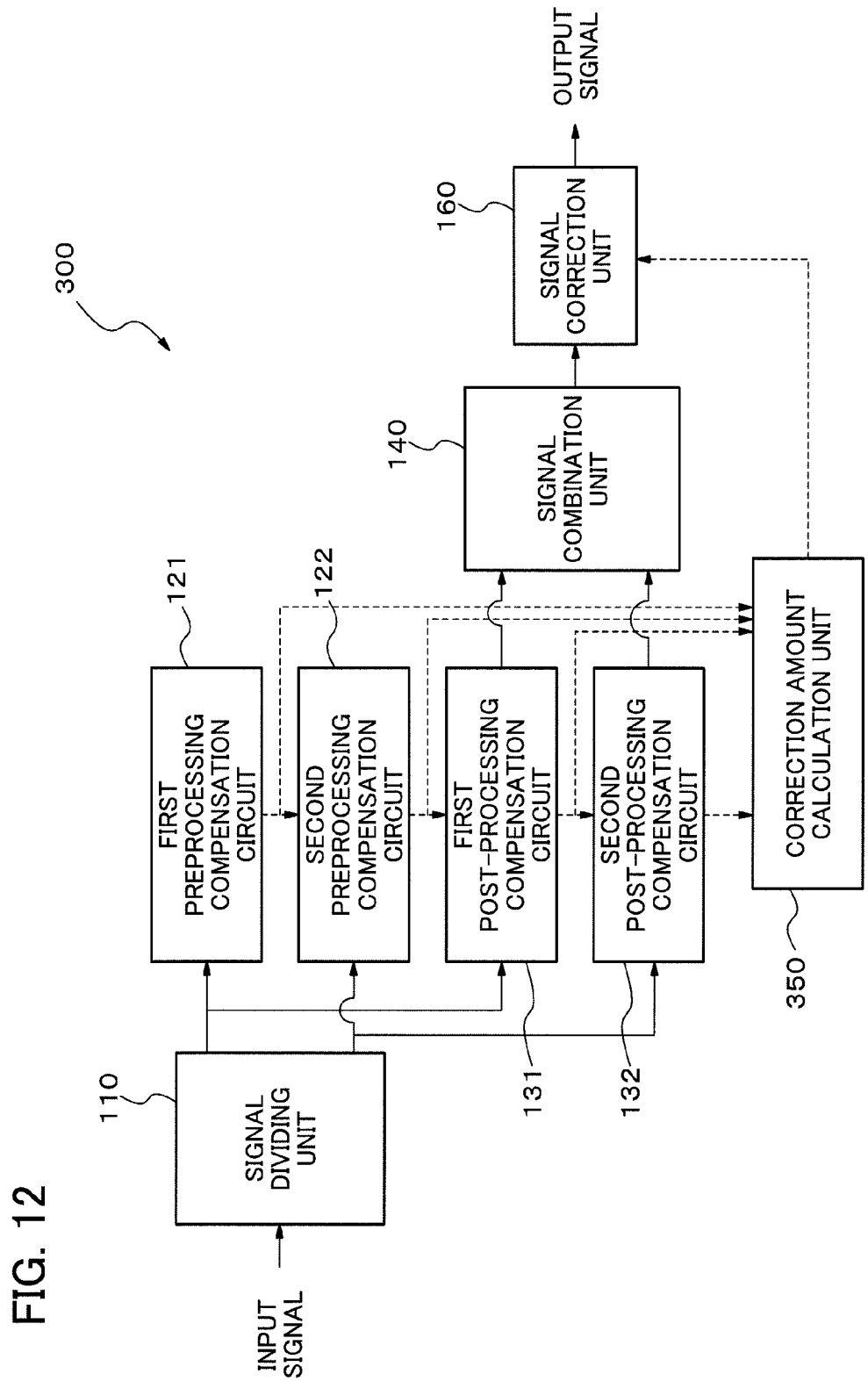
FIG. 12 is a block diagram showing a configuration of a phase excursion/carrier wave frequency excursion compensation device in accordance with the third exemplary embodiment of the present invention.

Next, the third exemplary embodiment of the present invention will be described. FIG. 12 is a block diagram showing the configuration of a phase excursion/carrier wave frequency excursion compensation device 300 in accordance with the third exemplary embodiment of the present invention. In the phase excursion/carrier wave frequency excursion compensation device 100 in accordance with the first exemplary embodiment, it is configured to transmit phase compensation amounts estimated by the second preprocessing compensation circuit 122 and the second post-processing compensation circuit 132 to the correction amount calculation unit 150 (refer to FIG. 1). In contrast, the phase excursion/carrier wave frequency excursion compensation device 300 in accordance with the present exemplary embodiment is configured to transmit furthermore phase compensation amounts estimated by the first preprocessing compensation circuit 121 and the first post-processing compensation circuit 131 to the correction amount calculation unit 350, as shown in FIG. 12. The correction amount calculation unit 350 calculates a correction amount by the phase compensation amounts transmitted respectively, as described below. The other configurations and operations are the same as those in the first exemplary embodiment.

The method by which the signal dividing unit 110 distributes frames to respective compensation circuits in the present exemplary embodiment is the same as that in the first exemplary embodiment. That is, timing diagrams illustrating the timings of distributing respective frames are the same as those shown in FIG. 2.

The correction amount calculation unit 350 in the present exemplary embodiment calculates a correction amount on the basis of the phase compensation amounts estimated by the first preprocessing compensation circuit 121 and the first post-processing compensation circuit 131 in addition to the phase compensation amounts estimated by the second preprocessing compensation circuit 122 and the second post-processing compensation circuit 132. For example, it calculates a first correction amount, as an individual correction amount, by the phase compensation amounts transmitted from the second preprocessing compensation circuit 122 and the second post-processing compensation circuit 132. It also calculates a second correction amount, as an individual correction amount, by the phase compensation amounts transmitted from the first preprocessing compensation circuit 121 and the first post-processing compensation circuit 131. Here, the correction amount calculation unit 350 sets an integration value of a value which is obtained from the difference between phase compensation amounts received from the preprocessing compensation circuits and the post-processing compensation circuits for each individual correction amount. It can be configured to transmit an average value of the first correction amount and the second correction amount as a correction amount to the signal correction unit 160. By this way, it becomes possible to perform correcting process with higher accuracy.

Further, if the phase excursion/carrier wave frequency excursion compensation device in accordance with the present exemplary embodiment has triply or more highly parallelized configuration, the most probable correction amount can be selected among a plurality of correction amounts by majority decision, for example.

As described above, according to the present exemplary embodiment, it is possible to realize fast compensation processing by using parallel processing with higher accuracy.

[The Fourth Exemplary Embodiment]

Figure 13:
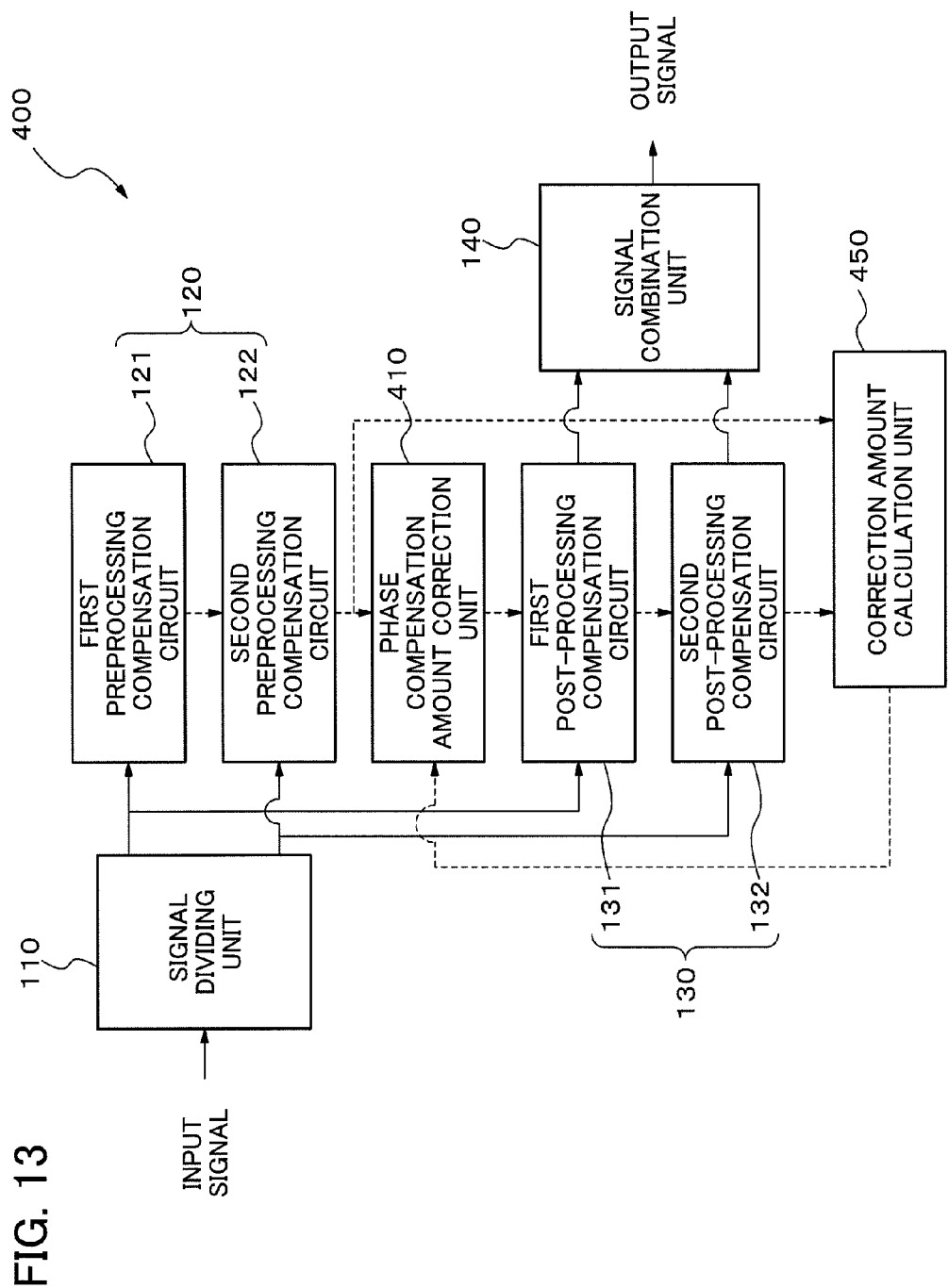
FIG. 13 is a block diagram showing a configuration of a phase excursion/carrier wave frequency excursion compensation device in accordance with the fourth exemplary embodiment of the present invention.

Next, the fourth exemplary embodiment of the present invention will be described. FIG. 13 is a block diagram showing the configuration of a phase excursion/carrier wave frequency excursion compensation device (parallelized compensation device) 400 in accordance with the fourth exemplary embodiment of the present invention. The parallelized compensation device 400 has a signal dividing unit 110, a preprocessing compensation circuit 120, a plurality of post-processing compensation circuits 130, a phase compensation amount correction unit 410, a signal combination unit 140, and a correction amount calculation unit 450. The parallelized compensation device 400 is different from the parallelized compensation device 100 in accordance with the first exemplary embodiment in that it is provided with the phase compensation amount correction unit 410 connected with the preprocessing compensation circuit 120 and the post-processing compensation circuit 130. The respective internal operations of the preprocessing compensation circuit 120, the post-processing compensation circuit 130, the signal combination unit 140, and the correction amount calculation unit 450 are the same as those in the parallelized compensation device 100 in the first exemplary embodiment. The signal correction unit 160 in the parallelized compensation device 100 becomes unnecessary for the parallelized compensation device 400 in the present exemplary embodiment.

Next, the operation of the parallelized compensation device 400 in accordance with the present exemplary embodiment will be described. The input signals inputted into the signal dividing unit 110 are distributed to each of the preprocessing compensation circuits 120 and the plurality of post-processing compensation circuits 130, and signal processing is parallelized by the plurality of post-processing compensation circuits 130. The case will be described below where, as shown in FIG. 13, the post-processing compensation circuit 130 is provided with the first post-processing compensation circuit 131 and the second post-processing compensation circuit 132, and thus the parallelization number of the parallelized compensation device is "2".

The second preprocessing compensation circuit 122 connected to the phase compensation amount correction unit 410 transmits estimated phase compensation amounts to the phase compensation amount correction unit 410. The correction amount calculation unit 450 calculates a correction amount for a phase compensation amount by the phase compensation amounts transmitted from the second preprocessing compensation circuit 122 and the second post-processing compensation circuit 132, and transmits this correction amount to the phase compensation amount correction unit 410.

The phase compensation amount correction unit 410 transmits the value as a corrected phase compensation amount, which is obtained by adding or subtracting the correction amount transmitted from the correction amount calculation unit 450 to or from the estimated phase compensation amount received from the second preprocessing compensation circuit 122, to the first post-processing compensation circuit 131. At that time, the phase compensation amount correction unit 410 performs the corrections for the estimated value of the phase compensation amount which is obtained for the symbols included in the frame corresponding to the transmitted correction amount. The first post-processing compensation circuit 131 calculates phase compensation amounts for the inputted signals by using the corrected phase compensation amount obtained from the phase compensation amount correction unit 410 as an initial value.

The time variation in a phase compensation amount estimated by the first preprocessing compensation circuit 121 and the second preprocessing compensation circuits 122 in the parallelized compensation device 400 is shown in FIG. 6, as is the case with the first exemplary embodiment. Here, the input signals are the same as those in cases that phase compensation amounts are estimated using the compensation circuit 500 which is not parallelized (refer to FIG. 19).

Figure 14:
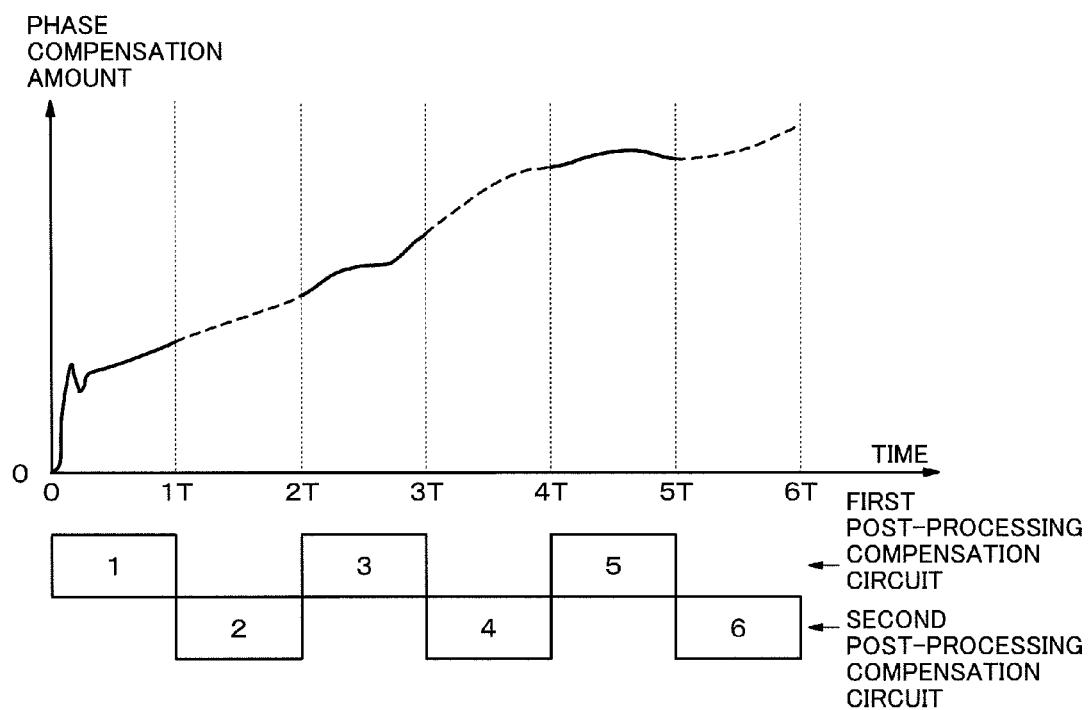
FIG. 14 is a diagram showing change with time of a phase compensation amount estimated by post-processing compensation circuits according to the fourth exemplary embodiment of the present invention.
Figure 15:
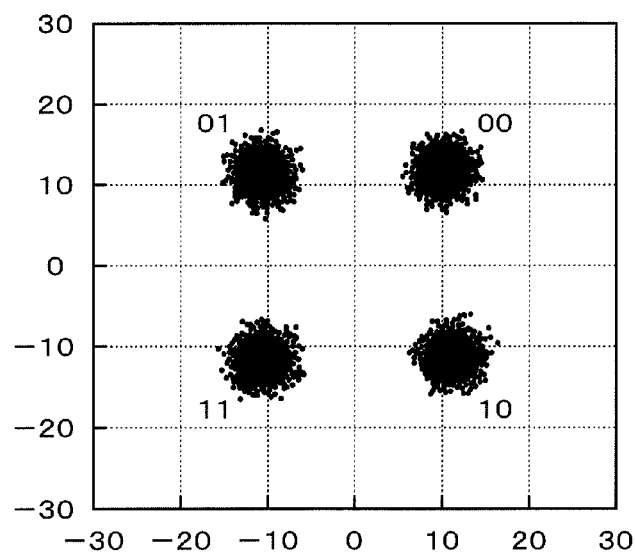
FIG. 15 is a diagram showing an example of a constellation and symbol mapping of QPSK.
Figure 16A:
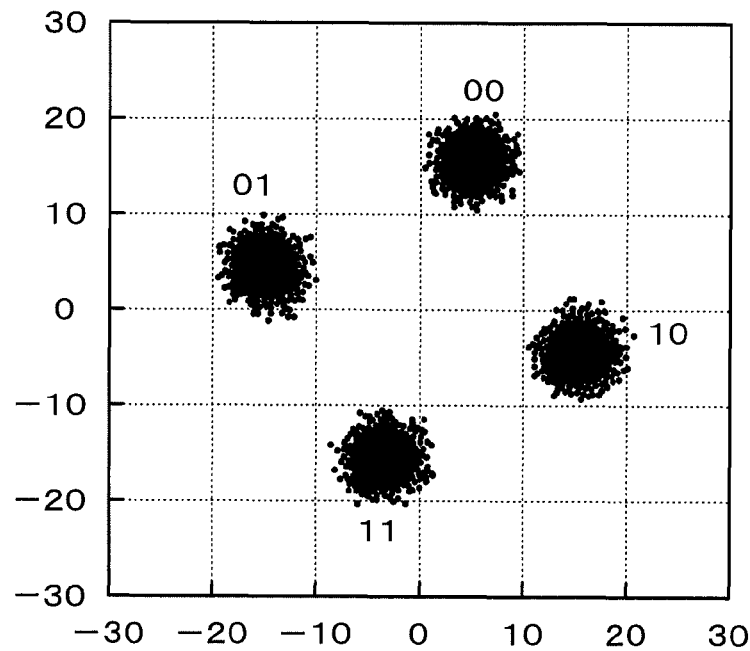
FIG. 16A is a diagram showing an example of a constellation map and symbol mapping of QPSK in cases that there exists an optical phase excursion.
Figure 16B:
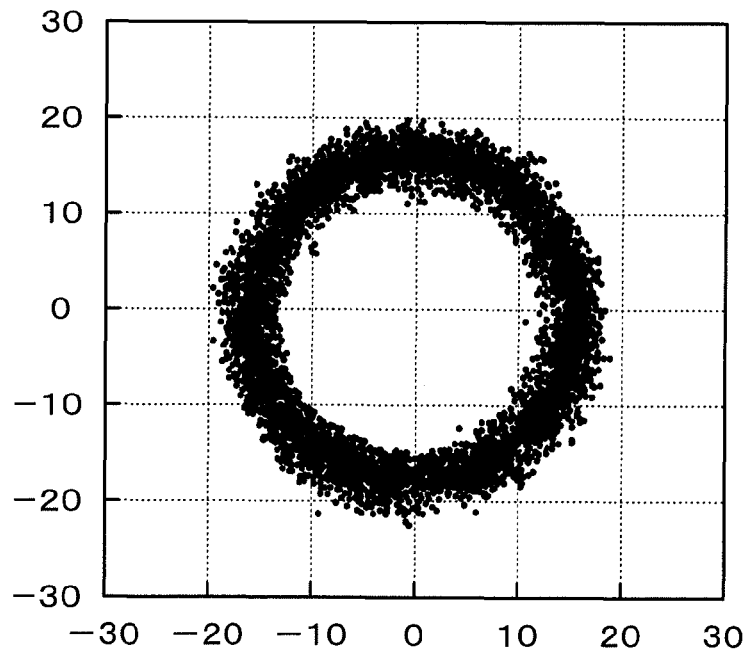
FIG. 16B is a diagram showing an example of a constellation map of QPSK in cases that there exists an optical carrier wave frequency excursion.

On the other hand, the time variation in a phase compensation amount estimated by the first post-processing compensation circuit 131 and the second post-processing compensation circuit 132 is shown in FIG. 14. In this figure, solid lines represent phase compensation amounts estimated by the first post-processing compensation circuit 131, and dotted lines represent phase compensation amounts estimated by the second post-processing compensation circuit 132, respectively.

As can be clearly seen from FIG. 14, the time variation in phase compensation amounts estimated by the first post-processing compensation circuit 131 and the second post-processing compensation circuit 132 is completely consistent with that of their expected values. It is because the parallelized compensation device 400 in the present exemplary embodiment is configured to perform correction process for the initial value of a phase compensation amount in the first post-processing compensation circuit 131 by the phase compensation amount correction unit 410.

According to the present exemplary embodiment, since the signal correction unit 160 in the first to the third exemplary embodiments becomes unnecessary, the circuit size can be reduced. As a result, fast compensation processing by using parallel processing can be realized with low power consumption and low manufacturing costs.

In the exemplary embodiments described above, the specific operations have been described in cases that the parallelization number of the phase excursion/carrier wave frequency excursion compensation device (parallelized compensation device) is "2", but the present invention is also available for the cases in which the parallelization number is set at "3" or more.

The present invention is not limited to the above-mentioned exemplary embodiments and can be variously modified within the scope of the invention described in the claims. It goes without saying that these modifications are also included in the scope of the invention.

This application is based upon and claims the benefit of priority from Japanese patent application No. 2010-026701, filed on Feb. 9, 2010, the disclosure of which is incorporated herein in its entirety by reference.

DESCRIPTION OF THE CODES

100, 101, 200, 300, 400 phase excursion/carrier wave frequency excursion compensation device (parallelized compensation device)
110, 521 signal dividing unit
120 preprocessing compensation circuit
121 first preprocessing compensation circuit
122 second preprocessing compensation circuit
130 post-processing compensation circuit
131 first post-processing compensation circuit
132 second post-processing compensation circuit
140, 523 signal combination unit
150, 350, 450 correction amount calculation unit
160 signal correction unit
170, 171, 172 pre/post-processing compensation circuit
180 phase compensation amount estimation unit
181, 511 phase error detection unit
182, 512 filter unit
183, 513 phase compensation amount calculation unit
184 phase compensation amount setting unit
410 phase compensation amount correction unit
500 related phase excursion/carrier wave frequency excursion compensation circuit
510 phase compensation amount estimation circuit
520, 530 related doubly parallelized compensation circuit
522-1 first compensation circuit
522-2 second compensation circuit
531 differential decoding unit

The invention claimed is:

1. A phase excursion/carrier wave frequency excursion compensation device, comprising:
   a signal dividing unit;
   a preprocessing compensation circuit;
   a plurality of post-processing compensation circuits;
   a signal combination unit;
   a correction amount calculation unit; and
   a signal correction unit;
   wherein the signal dividing unit divides inputted signals into frames with a predetermined time interval, and distributes the frames to the preprocessing compensation circuit and the plurality of post-processing compensation circuits;
   the preprocessing compensation circuit and the post-processing compensation circuits calculate phase compensation amounts for the inputted signals, and output the phase compensation amounts and compensation circuit output signals which are obtained by compensating the inputted signals with the phase compensation amounts;
   the signal combination unit outputs rearranged signals which are obtained by rearranging the compensation circuit output signals acquired from the post-processing compensation circuits according to the time ordering by which the inputted signals are inputted into the signal dividing unit;
   the correction amount calculation unit calculates a correction amount on the basis of the phase compensation amounts acquired from the preprocessing compensation circuit and the post-processing compensation circuits; and
   the signal correction unit corrects a phase of the rearranged signal by using the correction amount.

2. The phase excursion/carrier wave frequency excursion compensation device according to claim 1, wherein one post-processing compensation circuit among the plurality of post-processing compensation circuits acquires the phase compensation amount from the other post-processing compensation circuit or the preprocessing compensation circuit, and calculates phase compensation amounts for the inputted signals setting the acquired phase compensation amount for an initial value.

3. The phase excursion/carrier wave frequency excursion compensation device according to claim 1,
   wherein one of the preprocessing compensation circuit and the post-processing compensation circuits includes a phase compensation amount estimation unit and a multiplier;
   the phase compensation amount estimation unit includes a phase error detection unit, a filter unit, a phase compensation amount calculation unit, and a phase compensation amount setting unit;
   the phase error detection unit detects a change in phase excursions between neighboring two input signals;
   the filter unit removes a noise component included in a signal outputted from the phase error detection unit;
   the phase compensation amount calculation unit calculates phase compensation amounts on the basis of an initial phase compensation amount which the phase compensation amount setting unit acquires from one of the other preprocessing compensation circuit and the post-processing compensation circuits; and
   the multiplier calculates a product of an input signal and a complex number applying a reverse rotation corresponding to the phase compensation amount, and outputs it as the compensation circuit output signal.

4. The phase excursion/carrier wave frequency excursion compensation device according to claim 1,
   wherein the preprocessing compensation circuit and the post-processing compensation circuits are configured into a plurality of sets; and
   the correction amount calculation unit sets, for individual correction amount in each set, an integration value of a value which is obtained from the difference between phase compensation amounts respectively acquired from the preprocessing compensation circuits and the post-processing compensation circuits in each set, and calculates the correction amount on the basis of a plurality of the individual correction amounts.

5. The phase excursion/carrier wave frequency excursion compensation device according to claim 1,
   wherein the signal dividing unit repeats sequentially performing a process of firstly distributing the frames to the preprocessing compensation circuits and then distributing subsequent ones of the frames to the post-processing compensation circuits, per a processing time unit.

6. The phase excursion/carrier wave frequency excursion compensation device according to claim 1,
   wherein the correction amount calculation unit sets, for the correction amount, an integration value of a value which is obtained from the difference between phase compensation amounts respectively acquired from the preprocessing compensation circuit and the post-processing compensation circuits.

7. A phase excursion/carrier wave frequency excursion compensation device, comprising:
   a signal dividing unit;
   a preprocessing compensation circuit;
   a plurality of post-processing compensation circuits;
   a phase compensation amount correction unit;
   a signal combination unit; and
   a correction amount calculation unit;
   wherein the signal dividing unit divides inputted signals into frames with a predetermined time interval, and distributes the frames to the preprocessing compensation circuit and the plurality of post-processing compensation circuits;
   the preprocessing compensation circuit and the post-processing compensation circuits calculate phase compensation amounts for compensating the inputted signals, and output the phase compensation amounts and compensation circuit output signals which are obtained by compensating the inputted signals with the phase compensation amounts;
   the signal combination unit outputs rearranged signals which are obtained by rearranging the compensation circuit output signals acquired from the post-processing compensation circuits according to the time ordering by which the inputted signals are inputted into the signal dividing unit;
   the correction amount calculation unit calculates a correction amount on the basis of the phase compensation amounts acquired from the preprocessing compensation circuit and the post-processing compensation circuits; and
   the phase compensation amount correction unit outputs to the post-processing compensation circuits a corrected phase compensation amount which is obtained by correcting the phase compensation amount acquired from the preprocessing compensation circuit on the basis of the correction amount.

8. The phase excursion/carrier wave frequency excursion compensation device according to claim 7,
wherein one post-processing compensation circuit of the plurality of post-processing compensation circuits acquires the corrected phase compensation amount from the phase compensation amount correction unit, and calculates phase compensation amounts for inputted signals by using the corrected phase compensation amount as an initial value.

9. A phase excursion/carrier wave frequency excursion compensation method, comprising the steps of:
dividing inputted signals into frames with a predetermined time interval;
calculating first phase compensation amounts for the inputted signals included in a first frame of the frames;
calculating second phase compensation amounts for the inputted signals included in a second frame subsequent to the first frame setting the first phase compensation amount for an initial value, and calculating compensation circuit output signals which are obtained by compensating the inputted signals with the second phase compensation amounts;
outputting rearranged signals which are obtained by rearranging the compensation circuit output signals according to the order of the inputted signals;
calculating a correction amount on the basis of the first phase compensation amounts and the second phase compensation amounts for the identical frame; and
correcting a phase of the rearranged signal by using the correction amount.

10. A phase excursion/carrier wave frequency excursion compensation method, comprising the steps of:
dividing inputted signals into frames with a predetermined time interval;
calculating first phase compensation amounts for the inputted signals included in a first frame of the frames;
calculating second phase compensation amounts for the inputted signals included in a second frame subsequent to the first frame;
calculating a correction amount on the basis of the first phase compensation amounts and the second phase compensation amounts for the identical frame;
calculating a corrected phase compensation amount which is obtained by correcting the first phase compensation amount on the basis of the correction amount;
calculating third phase compensation amounts for inputted signals by using the corrected phase compensation amount as an initial value;
calculating compensation circuit output signals which are obtained by compensating the inputted signals with the third phase compensation amounts; and
outputting rearranged signals which are obtained by rearranging the compensation circuit output signals according to the order of the inputted signals.

* * * * *